(12) United States Patent
Flannery et al.

(10) Patent No.: US 10,932,589 B1
(45) Date of Patent: Mar. 2, 2021

(54) BASE UNIT FOR PLASTIC PLAYYARD OR BARRIER

(71) Applicant: Regalo International, LLC, Longboat Key, FL (US)

(72) Inventors: Mark A. Flannery, Longboat Key, FL (US); Gary T. Schultze, Savage, MN (US); Matthew A. Willms, Woodbury, MN (US)

(73) Assignee: Regalo International, LLC, Longboat Key, FL (US)

( * ) Notice: Subject to any disclaimer, the term of this patent is extended or adjusted under 35 U.S.C. 154(b) by 602 days.

(21) Appl. No.: 15/846,073

(22) Filed: Dec. 18, 2017

Related U.S. Application Data

(60) Provisional application No. 62/436,369, filed on Dec. 19, 2016.

(51) Int. Cl.
*A47D 13/06* (2006.01)

(52) U.S. Cl.
CPC ................................. *A47D 13/066* (2013.01)

(58) Field of Classification Search
CPC .. A47D 13/061; A47D 13/063; A47D 13/065; A47D 13/066; E04H 17/163; E04H 17/165; E04H 17/166; E04H 17/18; E06B 2009/002; Y10T 403/32459
USPC ............ 403/108; 256/25, 26, 27, 73; 49/384
See application file for complete search history.

(56) References Cited

U.S. PATENT DOCUMENTS

| | | | | |
|---|---|---|---|---|
| 5,924,242 | A | * | 7/1999 | Macari ...................... E06B 9/02 49/463 |
| 6,027,104 | A | | 2/2000 | Alexander et al. |
| 7,789,585 | B2 | * | 9/2010 | Christensen .......... E01F 13/022 404/6 |
| 7,887,029 | B2 | | 2/2011 | Flannery |
| D708,354 | S | | 7/2014 | Weisbeck et al. |
| D714,960 | S | | 10/2014 | Weisbeck |
| 8,944,415 | B2 | * | 2/2015 | Sirotin .................... E04H 17/16 256/26 |
| 9,615,672 | B2 | | 4/2017 | Weisbeck et al. |
| 2015/0027060 | A1 | * | 1/2015 | Sousa ................... E05B 53/001 49/394 |

OTHER PUBLICATIONS

"An Introduction to Hexagonal Geometry." Hexnet. Apr. 16, 2010, [online], [retrieved on Jul. 29, 2020] Retrieved from the Internet <URL: https://hexnet.org/content/hexagonal-geometry>.*

* cited by examiner

*Primary Examiner* — Josh Skroupa

(57) ABSTRACT

A base unit includes first and fourth connectors that are obliquely positioned relative to each other such that a first connector of a first base unit is engagable to a fourth connector of a second base unit. The present base unit further includes second and third connectors that are obliquely positioned relative to each other such that a second connector of the first base unit is engagable to a third connector of the second base unit. A set of base units may form a self-standing playyard enclosure or one or more of the base units may be clamped by the jaws of a bracket that in turn is pivotably engaged to a wall mount.

19 Claims, 16 Drawing Sheets

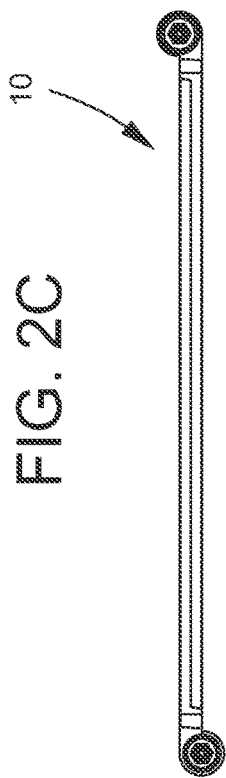
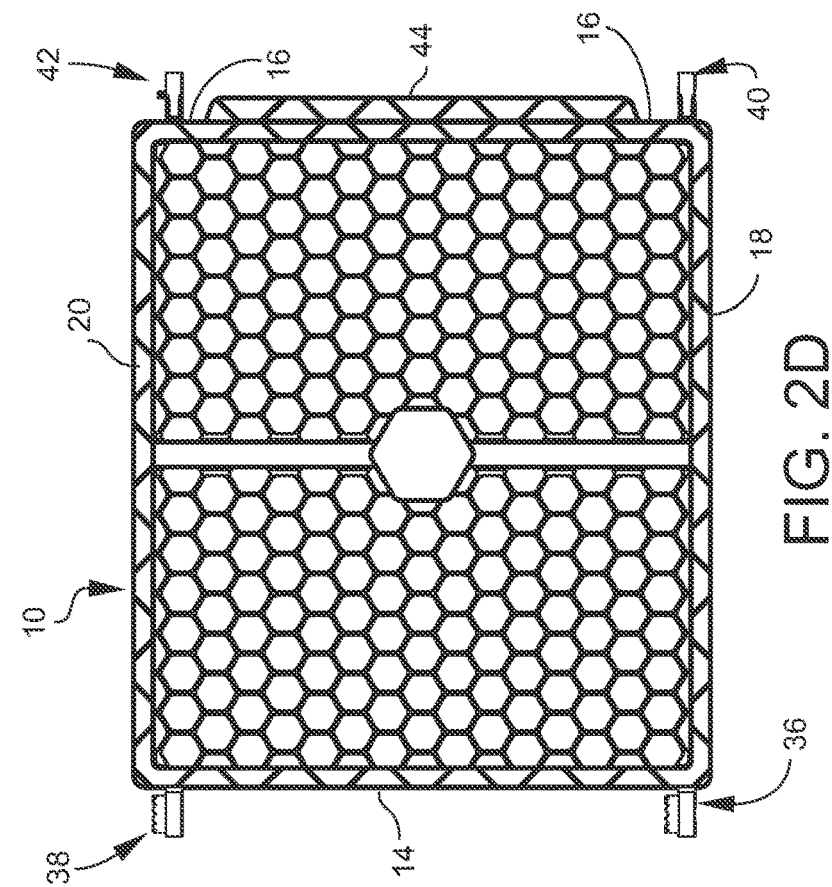
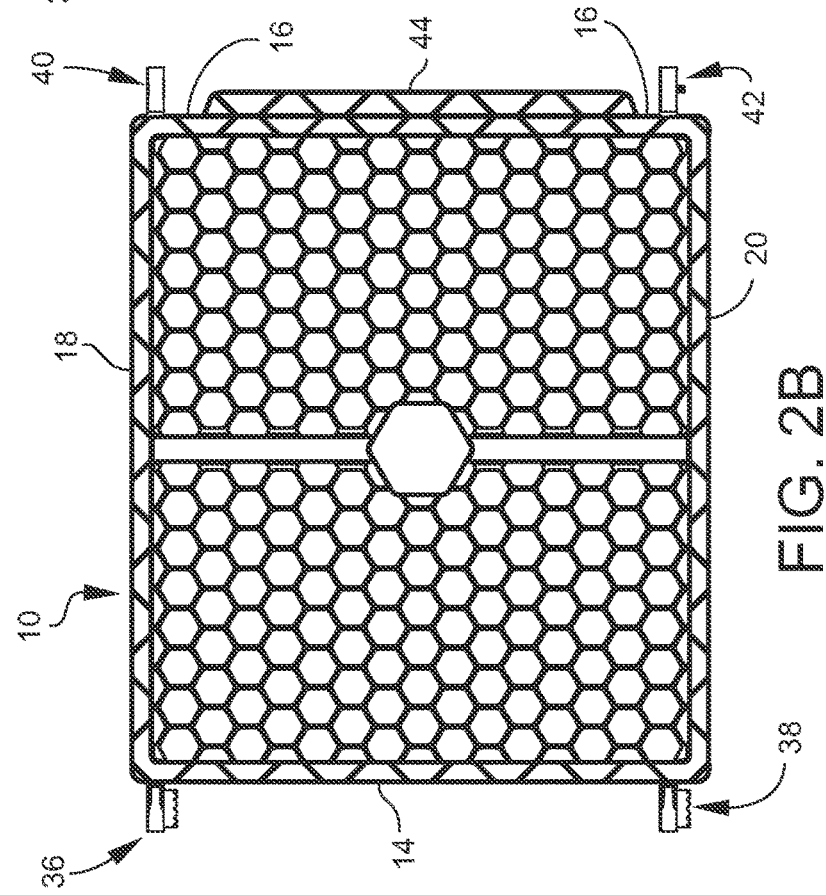
FIG. 2A  FIG. 2C
FIG. 2B  FIG. 2D

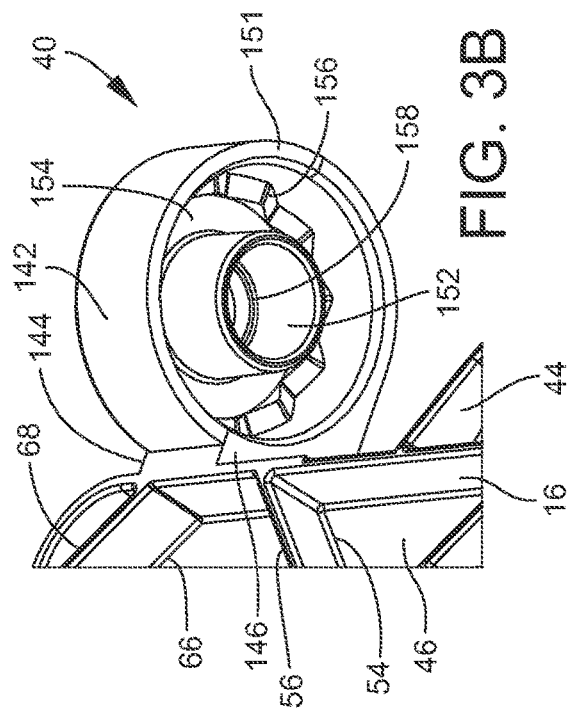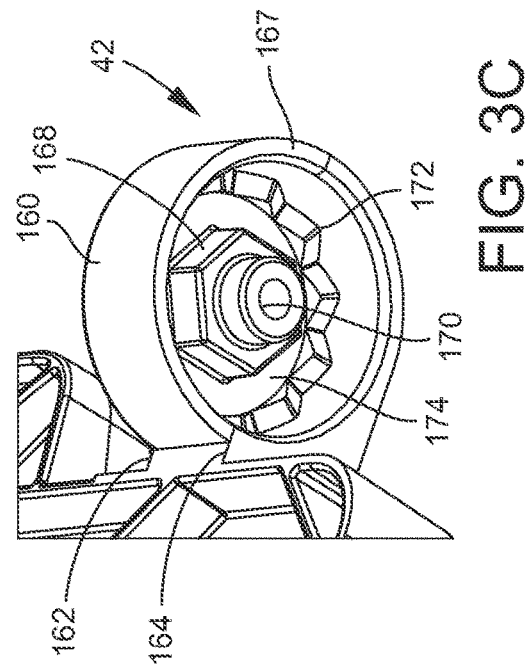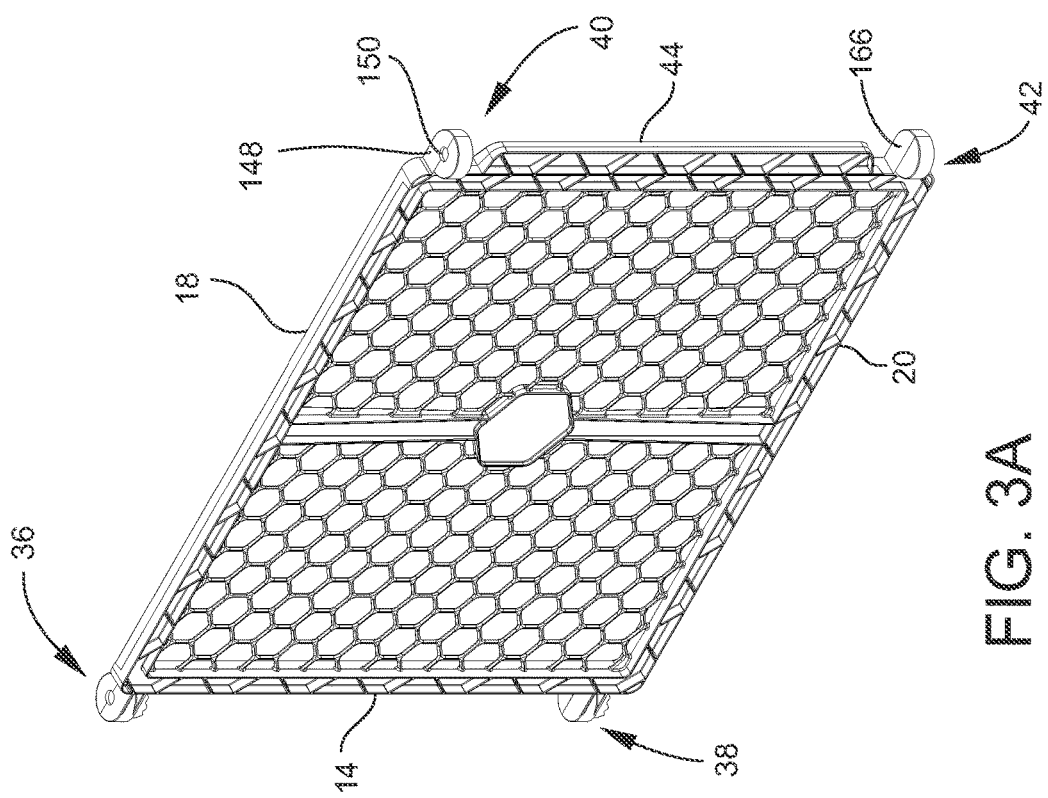

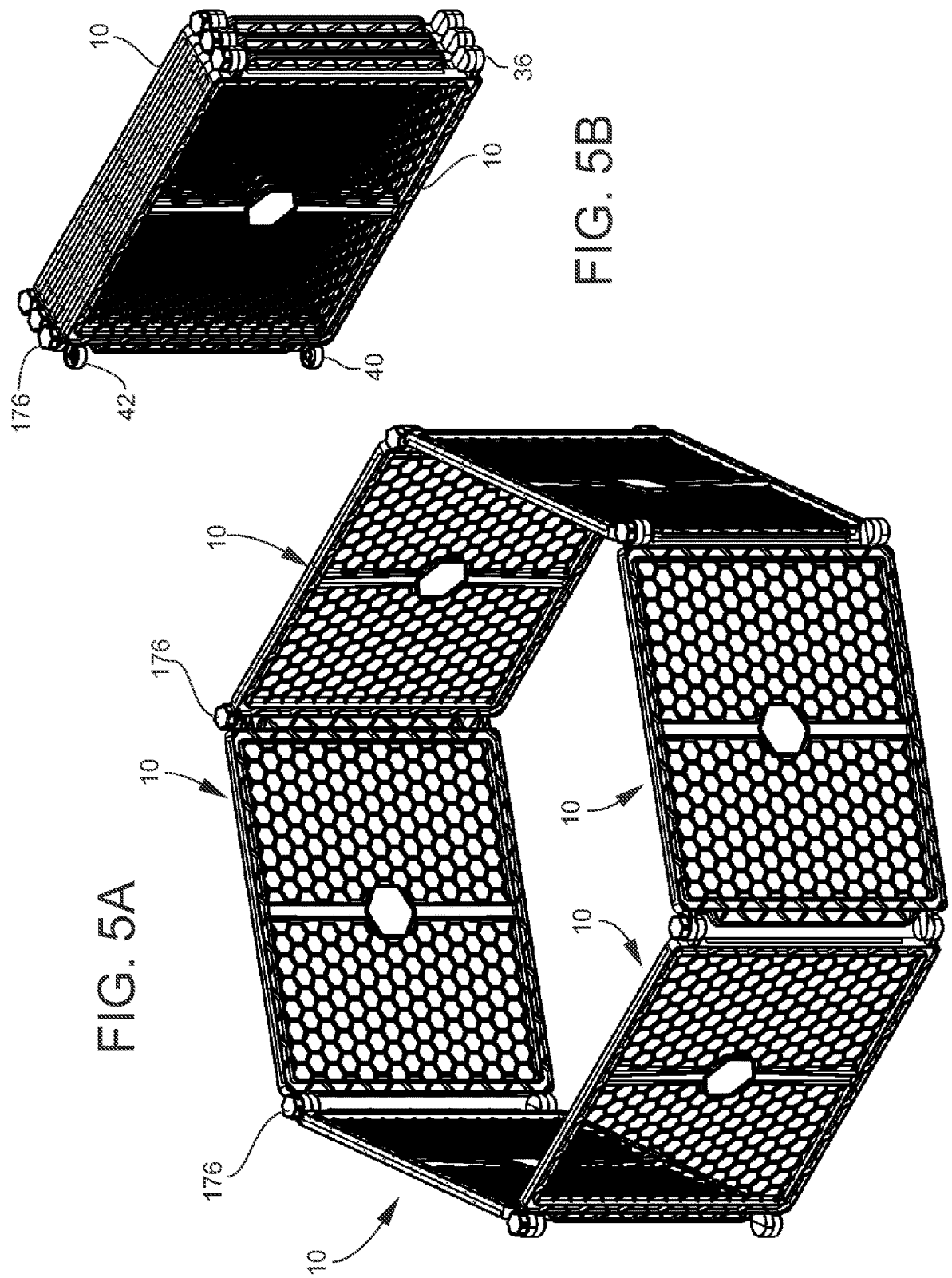

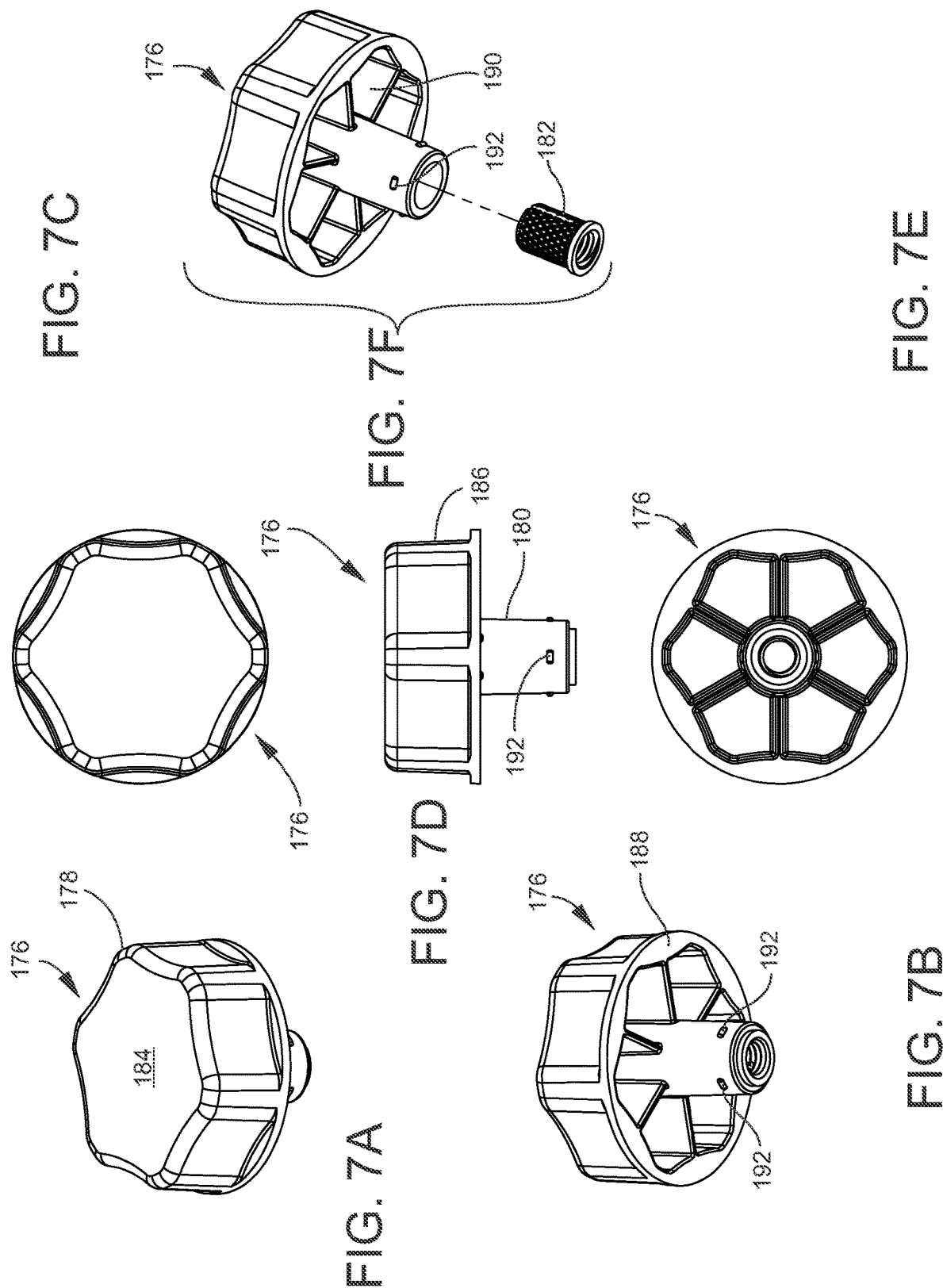

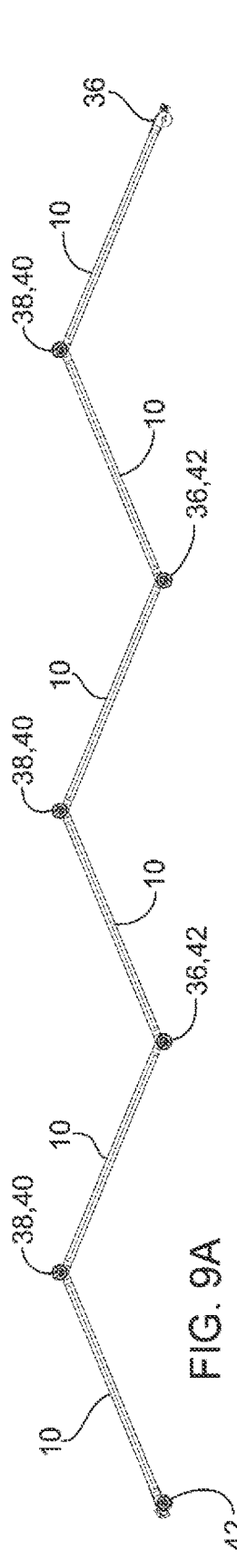
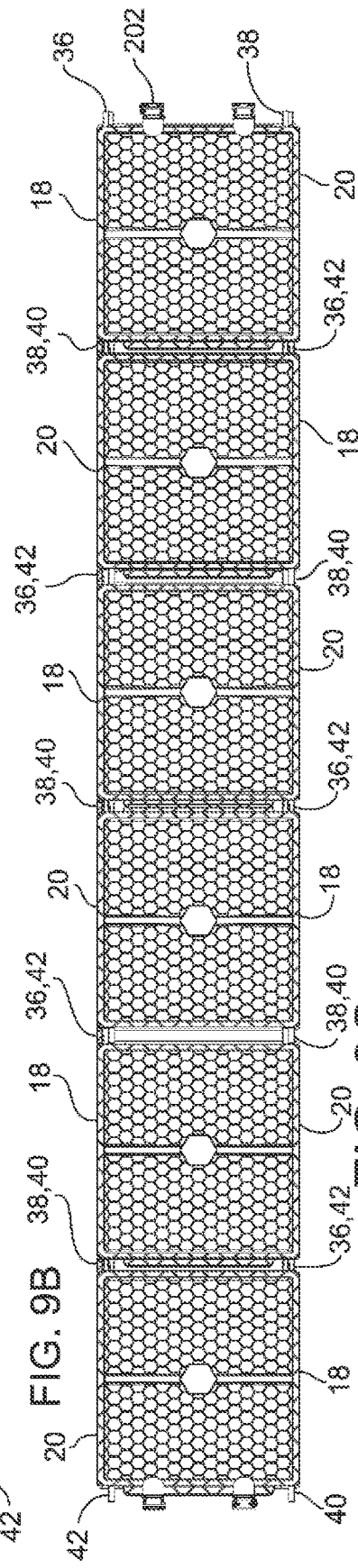
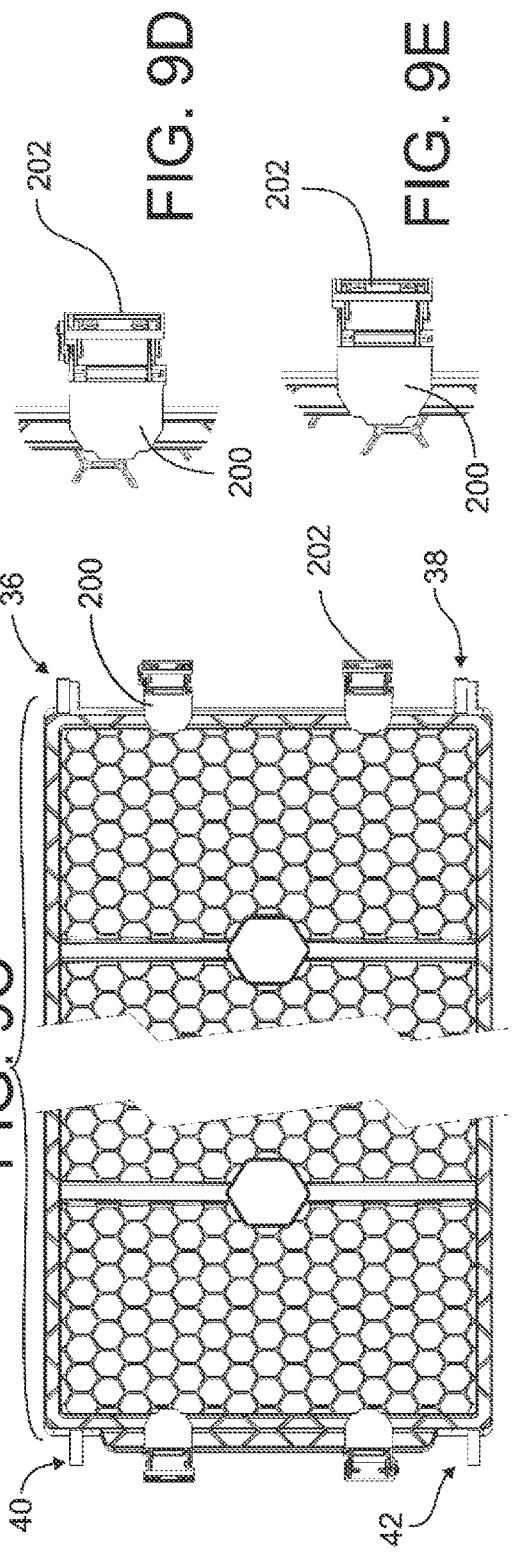
FIG. 9A
FIG. 9B
FIG. 9C
FIG. 9D
FIG. 9E

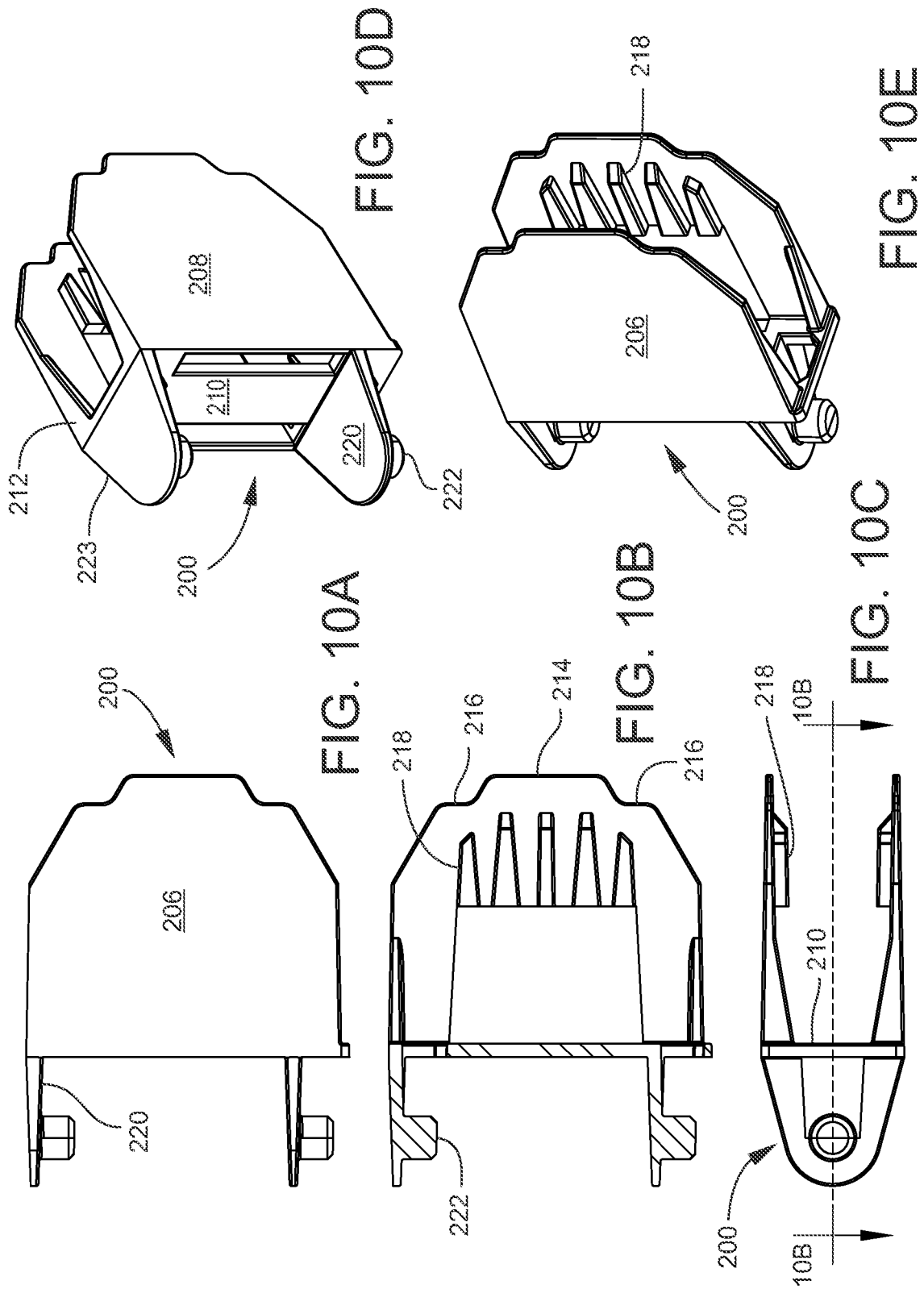

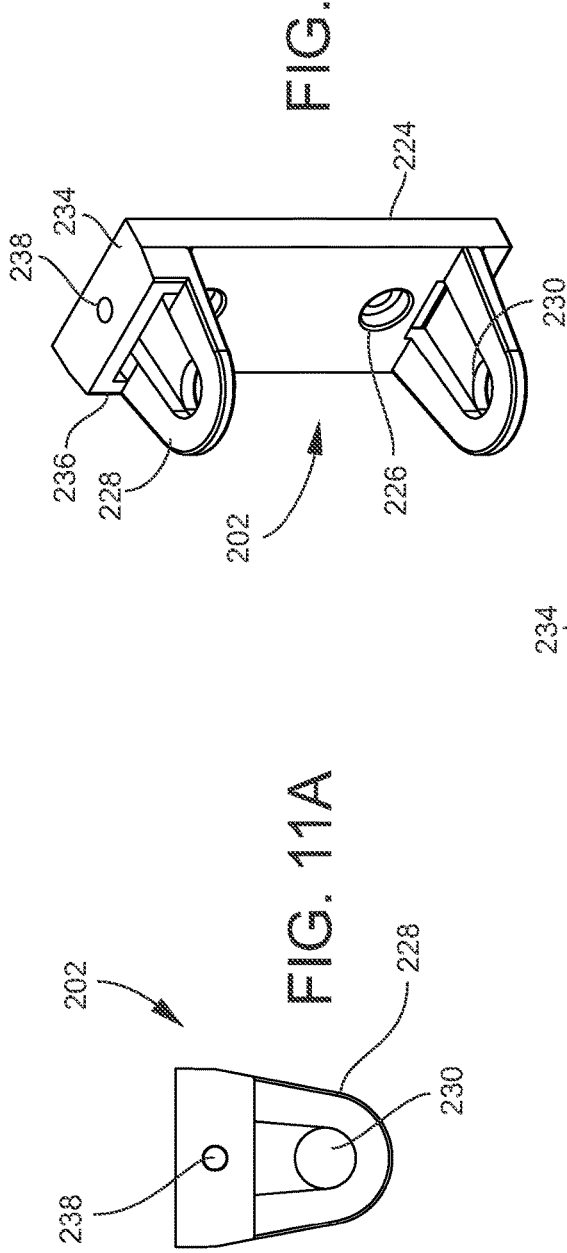
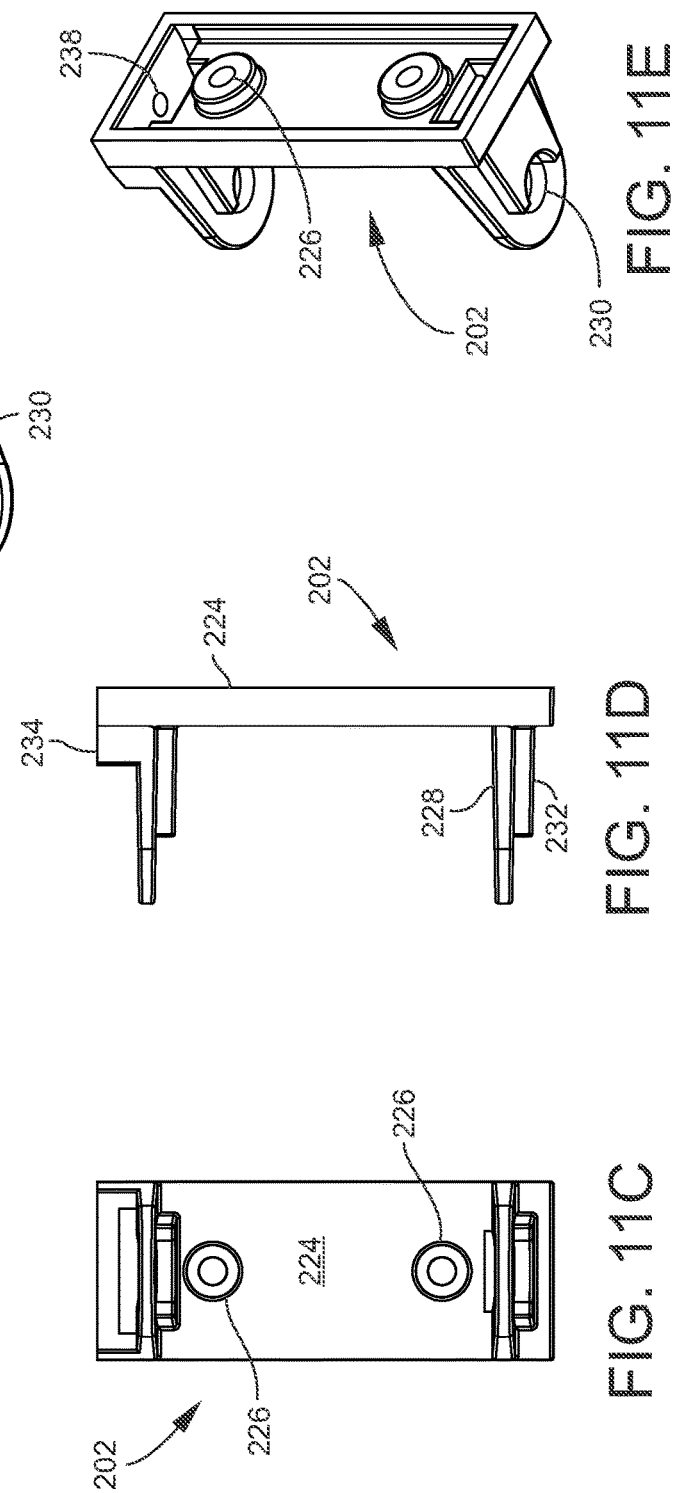

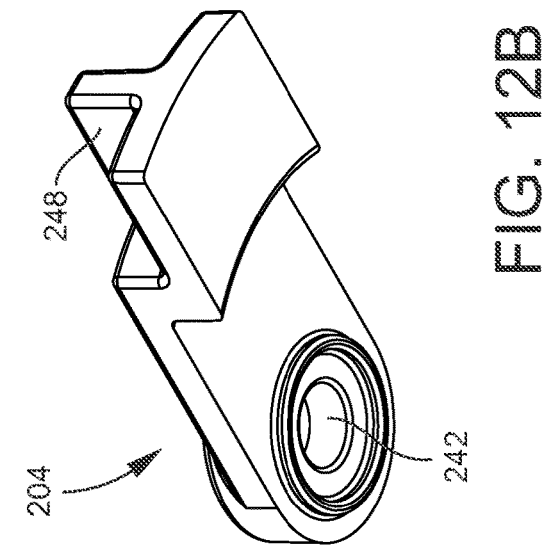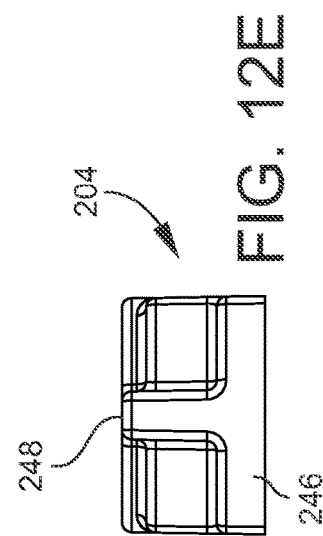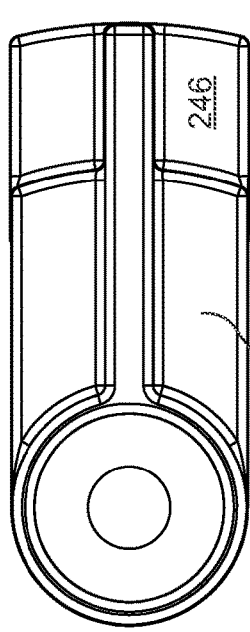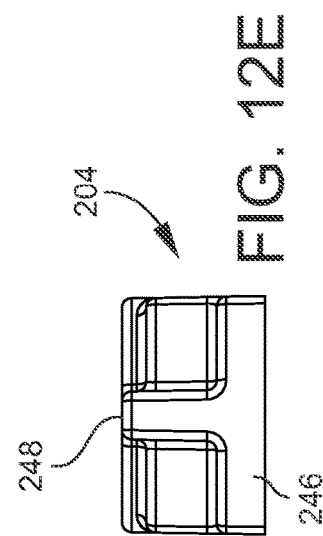

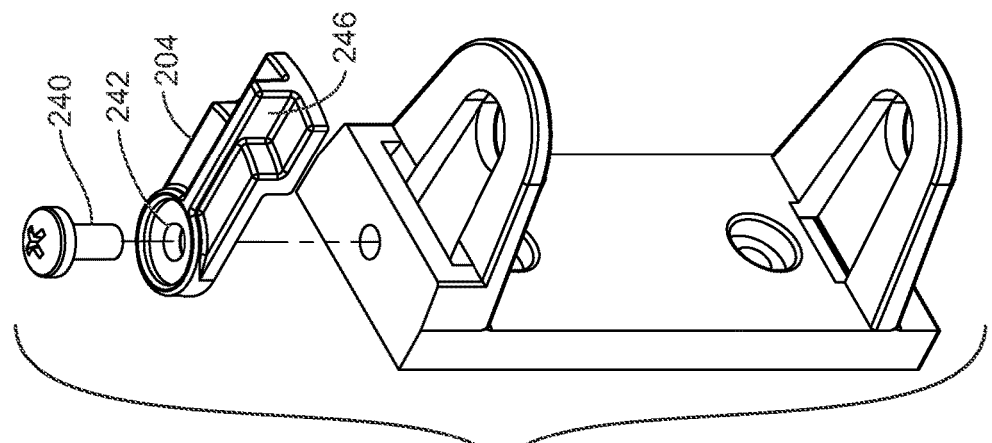
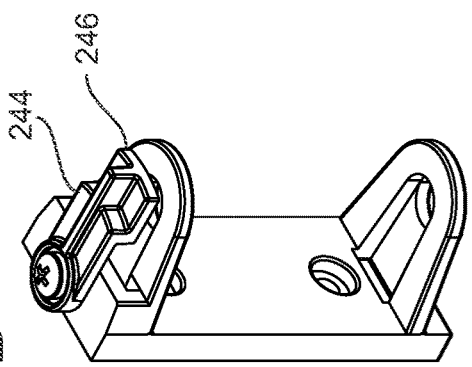
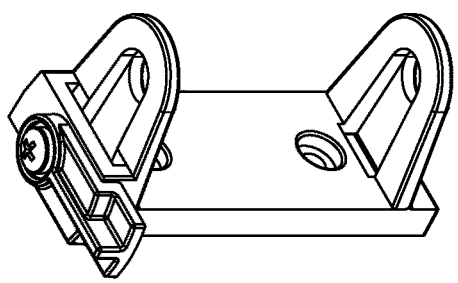
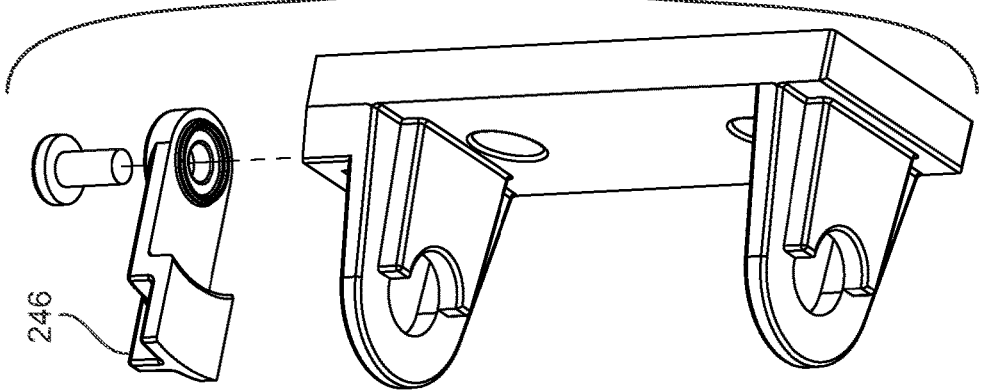
FIG. 13A
FIG. 13B
FIG. 13C
FIG. 13D

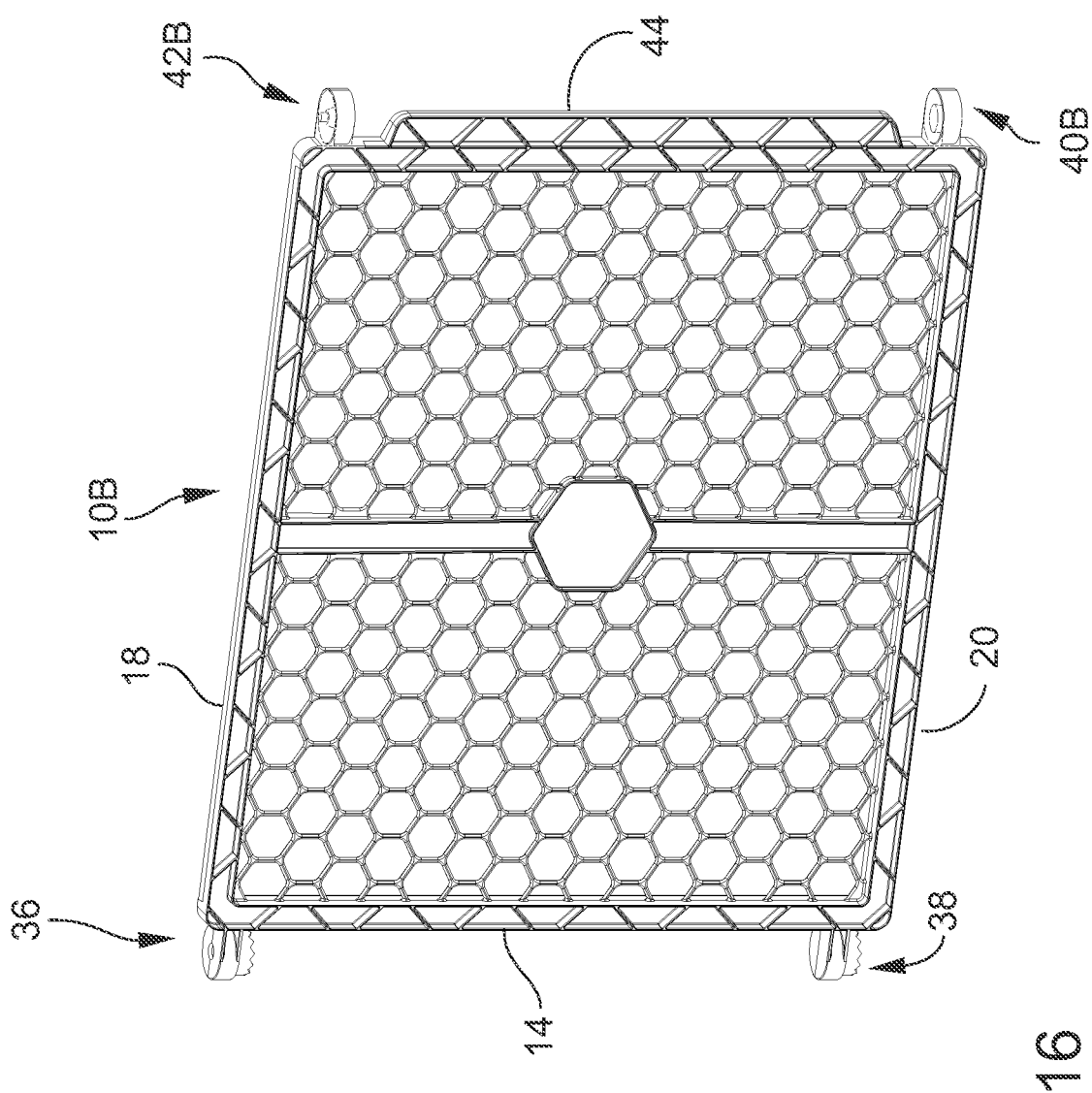

BASE UNIT FOR PLASTIC PLAYYARD OR BARRIER

This application claims the benefit under 35 U.S.C. 119(e) of U.S. Provisional Patent Application No. 62/436,369 filed Dec. 19, 2016, which application is hereby incorporated by reference in its entirety into this application.

FIELD OF THE INVENTION

The present invention relates to a base unit, more particularly to a repeating base unit, and more specifically to a repeating base unit that alternately flips orientation.

BACKGROUND OF THE INVENTION

A playyard is an enclosure. A barrier is a structure having ends that are spaced apart from each other. In certain situations with children and/or pets, a playyard is desirable. In certain other situations with children and/or pets, a barrier or fencing is desirable.

SUMMARY OF THE INVENTION

A feature of the present invention is the provision in a base unit, of a frame that includes first, second, third, and fourth frame members, where the first and second frame members are end frame members, where the third and fourth frame members are longitudinal frame members, where the third frame member is between the first and second members, and where the fourth member is between the first and second members.

Another feature of the present invention is the provision in a base unit, of a frame that includes a first plane and a second plane, the first and second planes being parallel to each other.

Another feature of the present invention is the provision in a base unit, of a body between the first, second, third and fourth frame members, where the body includes a network.

Another feature of the present invention is the provision in a base unit, of first and second connectors engaged to the first member, where the first and second connectors include a pivoting axis in the second plane, and of third and fourth connectors engaged to the second member, where the third and fourth connectors include a pivoting axis in the first plane.

Another feature of the present invention is the provision in a base unit, of the first and fourth connectors being obliquely positioned relative to each other, and of the second and third connectors being obliquely positioned relative to each other.

Another feature of the present invention is the provision in a base unit, of the first connector of a first base unit being engagable to the fourth connector of a second base unit and the second connector of the first base unit being engagable to the third connector of the second base unit.

Another feature of the present invention is the provision in a base unit, of the first connector including a male cylinder having a distal end and a set of annularly extending teeth on the distal end, and of the fourth connector including a female cylinder having an internal set of annularly extending teeth to engage the annularly extending teeth of the male cylinder.

Another feature of the present invention is the provision in a base unit, of the second connector including a male cylinder having a distal end and a set of annularly extending teeth on the distal end, and of the third connector including a female cylinder having an internal set of annularly extending teeth to engage the annularly extending teeth of the male cylinder.

Another feature of the present invention is the provision in a base unit, of each of the first, second, third and fourth frame members including an H-channel.

Another feature of the present invention is the provision in a base unit, of the H-channel running endlessly about the frame.

Another feature of the present invention is the provision in a base unit, of the H-channel including inner and outer walls, where each of the inner walls include a first edge on the first face and a second edge on the second face, where each of the outer walls include a first edge on the first face and a second edge on the second face, where the first edges of the inner and outer walls define such first plane, and where the second edges of the inner and outer walls define such second plane.

Another feature of the present invention is the provision in a base unit, of the network including a set of hexagonal rings.

Another feature of the present invention is the provision in a base unit, of an intermediate frame member, where the intermediate frame member runs from the third frame member to the fourth frame member intermediate of the first and second end members, and where the intermediate frame divides the network into two sections separated from each other.

Another feature of the present invention is the provision in a base unit, of the intermediate frame member including an H-channel.

Another feature of the present invention is the provision in a base unit, of the intermediate frame member including a center piece having a wall defining a third plane, where the third plane is between the first and second planes and parallel to the first and second planes, and where the center piece includes a periphery defining a hexagon.

Another feature of the present invention is the provision in a base unit, of a bracket having a pair of jaws that are resiliently spreadable apart from each other, where the jaws are spaced from each other by a first distance when at a rest position, where the first and second frame members include inner and outer walls having a depth, where the depth defines a second distance greater than the first distance, and where the jaws are resiliently spreadable apart to the second distance such that the jaws are clampable on one of the first and second frame members whereby the bracket can function to fix the base unit to an object.

Another feature of the present invention is the provision in a base unit, of the bracket including a pivot pin opposite of the jaws, and of a mount that is connectable to such object, where the mount includes a pin receiver for the pivot pin of the bracket.

Another feature of the present invention is the provision in a base unit, of a swing lock on the mount, where the swing lock is swingable over the pivot pin when the pivot pin is in the pin receiver to retain the pivot pin in the mount and to retain the bracket and base unit to the mount, where the swing lock is swingable to an out-of-the-way position away from the pivot pin to permit the pivot pin out of the pin receiver such that the bracket and base unit may be disengaged from the mount.

Another feature of the present invention is the provision in a base unit, of, when any of the longitudinal frame members of the first base unit is aligned with any of the longitudinal frame members of the second base unit, a) the first connector of the first base unit being engagable only to the fourth connector of a second base unit, being not engagable to the second connector of the second base unit, and being not engagable to the third connector of the second base unit; and b) the second connector of the first base unit being engagable only to the third connector of a second base unit, being not engagable to the first connector of the second base unit, and being not engagable to the fourth connector of the second base unit.

Another feature of the present invention is the provision in a base unit, of each of the first, second, third, and fourth connectors including a first interface, where the first interface of each of the first, second, third, and fourth connectors of the first base unit engages a second interface, respectively, of the fourth, third, second, and first connectors of the second base unit, where the third frame member extends between and confronts the first and third connectors and where the fourth frame member extends between and confronts the second and fourth connectors, where each of the longitudinal members includes an outer wall having an outer surface that defines a plane, where a distance from the first interface of the first connector to the plane of the outer surface of the fourth frame member is a first distance, where a distance from the first interface of the fourth connector to the plane of the outer surface of the third frame member is a second distance that is the same as the first distance, where a distance from said first interface of the second connector to the plane of the outer surface of the third frame member is a third distance, and where a distance from the first interface of the third connector to the plane of the outer surface of the fourth frame member is a fourth distance that is the same as the third distance such that when the first and second base units are engaged the third frame members of the first and second base units are disposed at the same elevation and the fourth frame members of the first and second base units are disposed at the same elevation.

Another feature of the present invention is a plastic playyard that is convertible to a gate that is wall mountable.

Another feature of the present invention is the provision in a plastic base unit apparatus convertible between an endless enclosure and a barrier having two opposite ends spaced apart from each other, of first, second, third, and fourth plastic base units, where each of the first, second, third, and fourth plastic base units are identical, and where each of the first, second, third, and fourth plastic base units include first, second, third and fourth end connectors.

Another feature of the present invention is the provision in a plastic base unit apparatus convertible between an endless enclosure and a barrier having two opposite ends spaced apart from each other, of the first and fourth connectors of each base unit being positioned obliquely of each other, of the second and third connectors of each base unit being positioned obliquely of each other, of the first and fourth connectors of different base units being engagable to each other, and of the second and third connectors of different base units being engagable to each other.

Another feature of the present invention is the provision in a plastic base unit apparatus convertible between an endless enclosure and a barrier having two opposite ends spaced apart from each other, of each of the base units having a top and a bottom such that adjacent base units in the endless enclosure and in the barrier have a top adjacent to a bottom.

Another feature of the present invention is the provision in a plastic base unit apparatus convertible between an endless enclosure and a barrier having two opposite ends spaced apart from each other, of each of the first and fourth connectors being disengagable from each other and each of the second and third connectors being disengagable from each other such that the endless enclosure may be reconfigured into a barrier having two opposite ends.

Another feature of the present invention is the provision in a plastic base unit apparatus convertible between an endless enclosure and a barrier having two opposite ends spaced apart from each other, of a bracket having a pair of jaws that are resiliently spreadable apart from each other, where the jaws are spaced from each other by a first distance when at a rest position, where the base unit has a depth, where the depth defines a second distance greater than the first distance, and where the jaws are resiliently spreadable apart to the second distance such that the jaws are clampable on one of the base units whereby the bracket can function to fix the base unit to an object.

Another feature of the present invention is the provision in a plastic base unit apparatus convertible between an endless enclosure and a barrier having two opposite ends spaced apart from each other, of the bracket including a pivot pin opposite of the jaws, and of a mount that is connectable to the object, where the mount includes a pin receiver for the pivot pin of the jaw.

Another feature of the present invention is the provision in a plastic base unit apparatus convertible between an endless enclosure and a barrier having two opposite ends spaced apart from each other, of a swing lock on the mount, where the swing lock is swingable over the pivot pin when the pivot pin is in the pin receiver to retain the pivot pin in the mount and to retain the bracket and the base unit to the mount, and where the swing lock is swingable to an out-of-the-way position away from the pivot pin to permit the pivot pin out of the pin receiver such that the bracket and the base unit may be disengaged from the mount.

Another feature of the present invention is the provision in a base unit having first and second faces, of a periphery that is rectangular and endless, where the periphery includes first, second, third and fourth peripheral members, where the first and second peripheral members oppose each other and run parallel to each other, where the third and fourth peripheral members oppose each other and run parallel to each other, where the periphery defines a first H-channel where the first H-channel is defined by an inner wall, an outer wall, and a joining wall running between the inner and outer walls, where the inner and outer walls run parallel to each other, where the joining wall extends at a right angle to each of the inner and outer walls, where the periphery further includes braces extending from the inner wall to the outer wall, and where the braces extend obliquely relative to the inner and outer walls.

Another feature of the present invention is the provision in a base unit having first and second faces, of a support extending to and between the third and fourth peripheral members and at a right angle thereto, where the support extends parallel to the first and second peripheral members, and where the support includes a second H-channel.

Another feature of the present invention is the provision in a base unit having first and second faces, of a first body between the first peripheral member and the support, where the first body includes a repeating ring element, and of a second body between the second peripheral member and the support, where the second body includes the repeating ring element.

Another feature of the present invention is the provision in a base unit having first and second faces, of the second H-channel including opposing walls and a connecting wall, where the connecting wall extends at a right angle to each of the opposing walls, where the opposing walls run parallel to each other, where the second H-channel is split by an integral piece, where the integral piece includes a peripheral wall and an inside wall, where the inside wall is bounded by the peripheral wall, where the peripheral wall extends at a right angle to the inside wall, where the inside wall is coplanar with the connecting wall of the second H-channel and extends from intermediate sections of the peripheral wall such that the peripheral wall extends to the first and second faces of the plastic playyard panel, where the integral piece divides the second H-channel into first and second H-channel sections such that a first H-channel section extends from the integral piece to the third peripheral member and such that the second H-channel section extends from the integral piece to the fourth peripheral member.

Another feature of the present invention is the provision in a base unit having first and second faces, of the repeating ring including a first shape and the integral piece including a second shape, where the first and second shapes are generally identical, and where the integral piece is larger than a single repeating ring.

An advantage of the present invention is that the entire base unit or panel is plastic, with the exception of two metal pins disposed in connectors longitudinally opposite of one another.

Another advantage of the present invention is that the entire base unit is one piece and integral, including the two metal pins that are embedded in the connectors disposed longitudinally opposite of each other.

Another advantage is that all teeth of a pair of engaged connectors are hidden from view after a first connector having exposed teeth is engaged to a second connector having internal teeth.

Another advantage of the present invention is that no tools, such as hand tools like screwdrivers, are required to set up endless enclosures such as playyard and barriers or fences, except when it is desirable to fix a wall mount to a wall or other vertical surface.

Another advantage is that a set of two, three, four or more base units may be engaged end to end and lie in parallel and adjacent planes to each other in a suitcase like form, where a planar face of one base unit is adjacent to a planar face of a second base unit.

Another advantage is that, since one base unit is formed of plastic and is relatively light, a set of base units folded into a suitcase form is also relatively light.

Another advantage is that an endless enclosure such as a playyard can be quickly converted into a barrier or fence like form.

Another advantage is that the barrier or fence like form can be engaged to a wall by employing a wall mount and bracket, which wall mount and bracket is a quick connection that can open in the nature of a gate to permit passage between the base unit and the wall.

Another advantage is that connectors between base units are in the nature of quick connects such that two base units engaged to each other can be disengaged from each other quickly to permit passage therethrough.

Another advantage is that the present base unit or panel is inexpensive because it is almost entirely formed from plastic, with the wall mount, brace and swing lock also being formed of plastic.

BRIEF DESCRIPTION OF THE DRAWINGS

FIG. 2A is a top view of the base unit with a first face positioned forwardly and a first longitudinal frame member being positioned on top.
FIG. 2B is a front view of the base unit of FIG. 2A with a first face positioned forwardly and a first longitudinal frame member being positioned on top.
FIG. 2C is a top view of the base unit with a second face positioned forwardly and a second longitudinal frame member being positioned on top.
FIG. 2D is a front view of the base unit of FIG. 2C with a second face positioned forwardly and a second longitudinal frame member being positioned on top.
FIG. 3A is a perspective view of the base unit of FIG. 2B with a first face positioned forwardly and a first longitudinal frame member being positioned on top.
FIG. 3B is a perspective view of the right upper connector of the base unit of FIG. 3A from a position underneath the right upper connector.
FIG. 3C is a perspective view from of the right lower connector of the base unit of FIG. 3A from a position underneath the right lower connector.
FIG. 5A is a perspective view of six base units of FIG. 2B arranged in playyard form.
FIG. 5B is a perspective view of the six base units of FIG. 5A folded into a compact suitcase-like form where each of the base units define a plane and where the planes defined by the base units are parallel to each other.
FIG. 7A shows a top perspective view of the hand wheel of FIG. 6A.
FIG. 7B shows a bottom perspective view of the hand wheel of FIG. 7A.
FIG. 7C shows a top view of the hand wheel of FIG. 7A.
FIG. 7D shows a side view of the hand wheel of FIG. 7A.
FIG. 7E shows a bottom view of the hand wheel of FIG. 7A.
FIG. 7F shows a perspective view of the hand wheel of FIG. 7A and further shows a metal pin receiver insertable into the shaft of the hand wheel.
FIG. 9A is a top view showing the base unit of FIG. 2B repeating to form a zig-zag barrier.
FIG. 9B is a side view showing the base unit of FIG. 2B repeating to form a straight planar barrier where all of the base units are disposed in a common plane.

FIG. 9C is a broken apart side view of the base units of FIG. 9B and shows in greater detail brackets and wall mounts for fixing the repeating base units between two vertical surfaces.

FIG. 9D is a side view of the upper right bracket and wall mount of FIG. 9C.

FIG. 9E is a side view of the lower right bracket and wall mount of FIG. 9C.

FIG. 10A is a top view of the bracket of FIG. 9E.

FIG. 10B is a section view of the bracket of FIG. 10A along the lines of 10B-10B of FIG. 10C.

FIG. 10C is a top view of the bracket of FIG. 10A.

FIG. 10D is a rear perspective view of the bracket of FIG. 10A.

FIG. 10E is a front perspective view of the bracket of FIG. 10A.

FIG. 11A is a top view of the wall mount of FIG. 9E.

FIG. 11B is a front perspective view of the wall mount of FIG. 11A.

FIG. 11C is a front view of the wall mount of FIG. 11A.

FIG. 11D is a side view of the wall mount of FIG. 11A.

FIG. 11E is a rear perspective view of the wall mount of FIG. 11A.

FIG. 12A is a top perspective view of a swing lock that retains the bracket and panel on the wall mount of FIG. 11A.

FIG. 12B is a bottom perspective view of the swing lock of FIG. 12A.

FIG. 12C is a top view of the swing lock of FIG. 12A.

FIG. 12D is a side view of the swing lock of FIG. 12A.

FIG. 12E is a front view of the swing lock of FIG. 12A.

FIG. 13A is an exploded bottom perspective view of the swing lock of FIG. 13A and the wall mount of FIG. 11A.

FIG. 13B is an assembled view of the swing lock and wall mount of FIG. 13A where the swing lock is in a retaining position.

FIG. 13C is an assembled view of the swing lock and wall mount of FIG. 13A where the swing lock is in an out-of-the-way position.

FIG. 13D is an exploded top perspective view of the swing lock and wall mount of FIG. 13A.

FIG. 16 shows an alternate unit where the right side connectors of the base unit are switched with each other and turned upside down so as to build playyards having an odd number of sides such as three, five, seven (and so on) sides.

DESCRIPTION

Figure 1A:
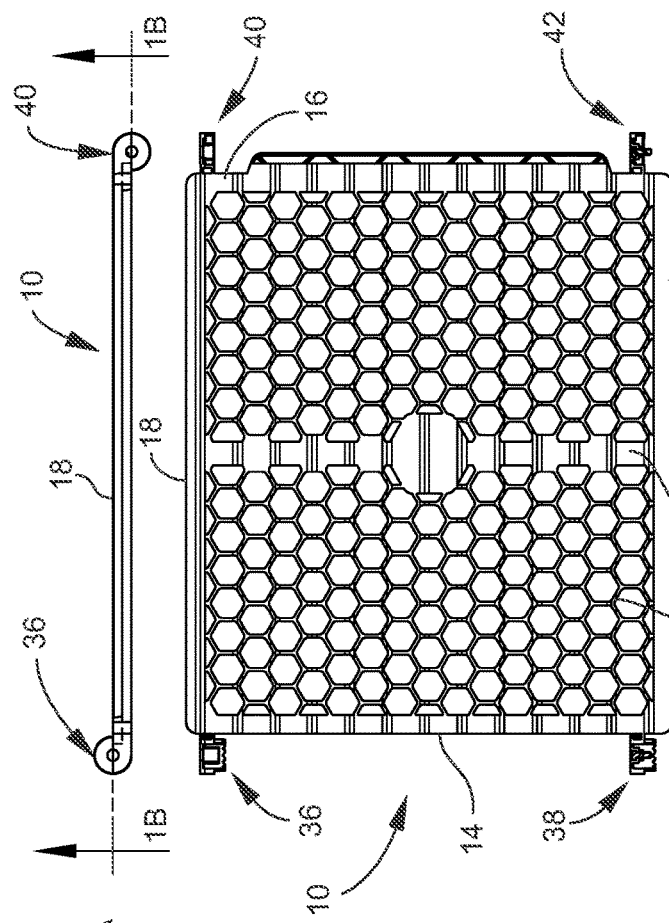
FIG. 1A is a top view of the present base unit.
Figure 1D:
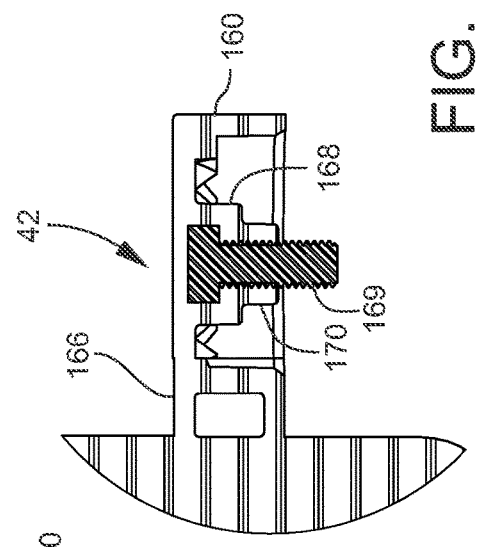
FIG. 1B is a section view of the base unit at lines 1B-1B of FIG. 1A.
FIG. 1C is a section view of the lower left connector of FIG. 1B.
FIG. 1O is a section view of the lower right connector of FIG. 1B.
Figure 1C:
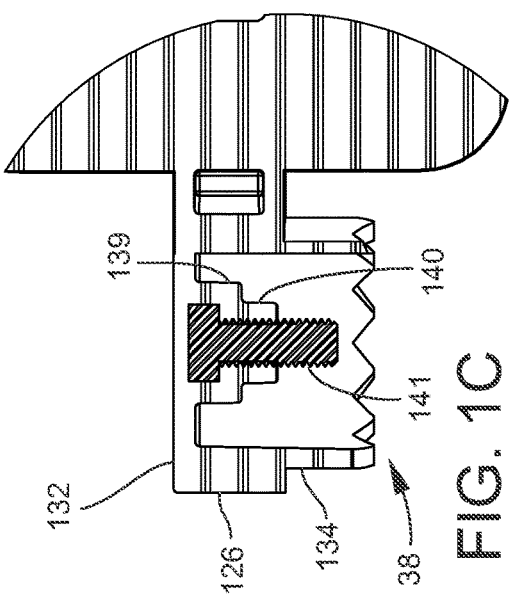
Figure 4A:
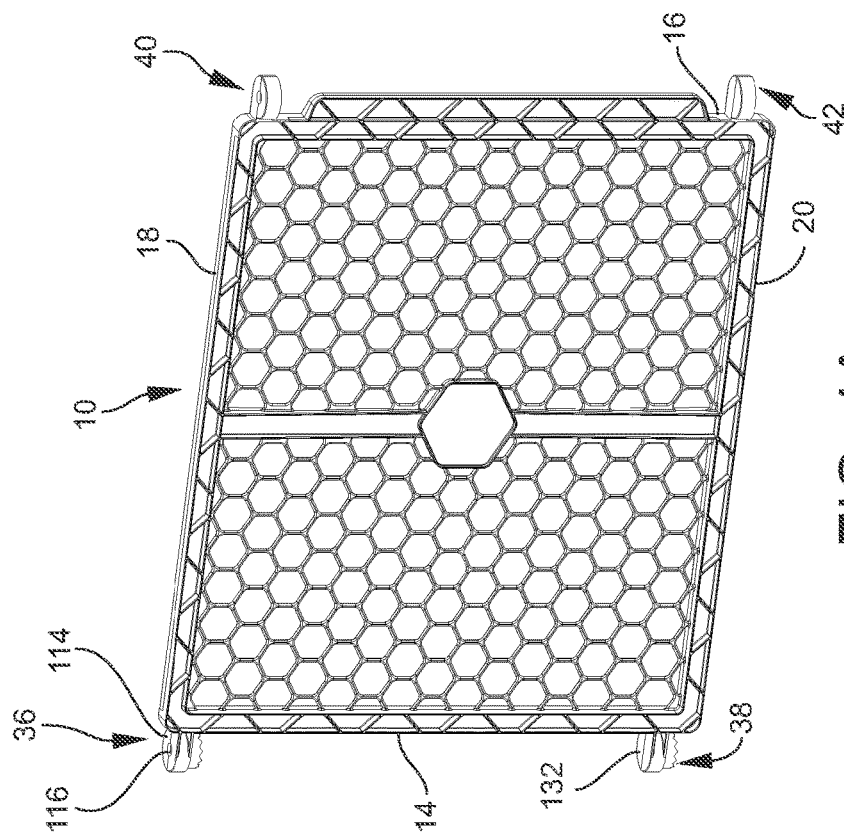
FIG. 4A is a perspective view of the base unit of FIG. 3A with a first face positioned forwardly and a first longitudinal frame member being positioned on top.
Figure 4B:
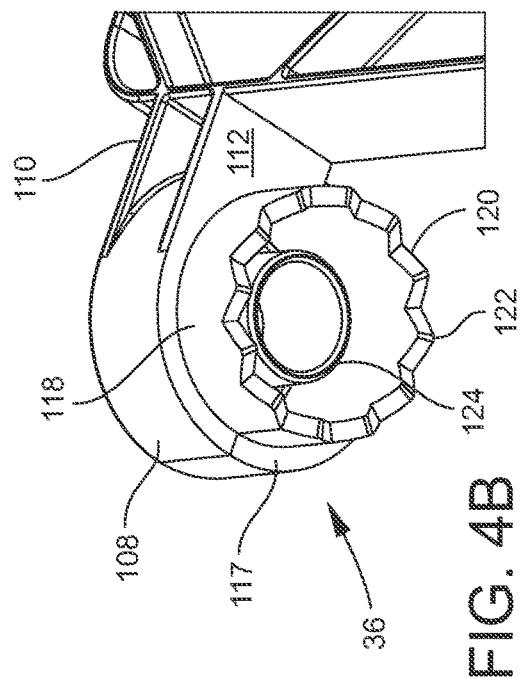
FIG. 4B is a perspective view of the left upper connector of the base unit of FIG. 4A from a position underneath the left upper connector.
Figure 4C:
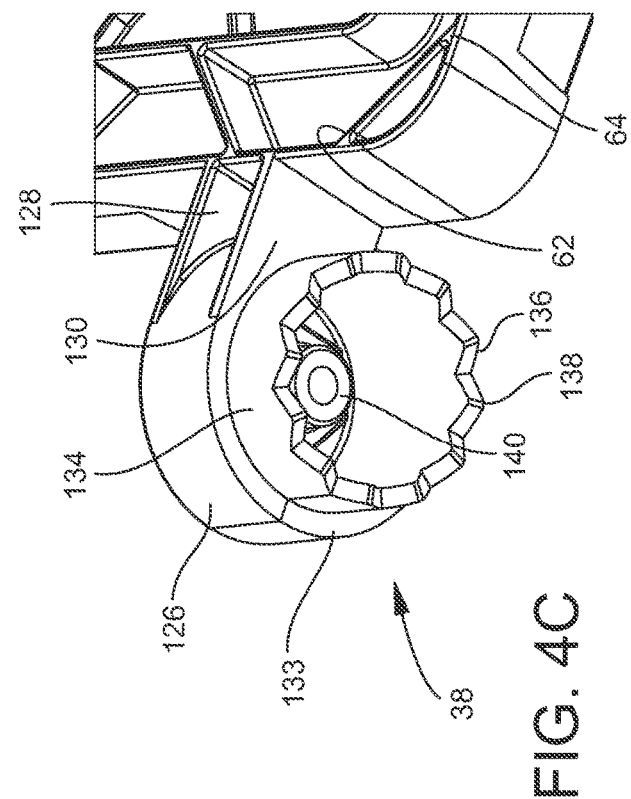
FIG. 4C is a perspective view of the left lower connector of the base unit of FIG. 4A from a position underneath the left lower connector.
Figure 6A:
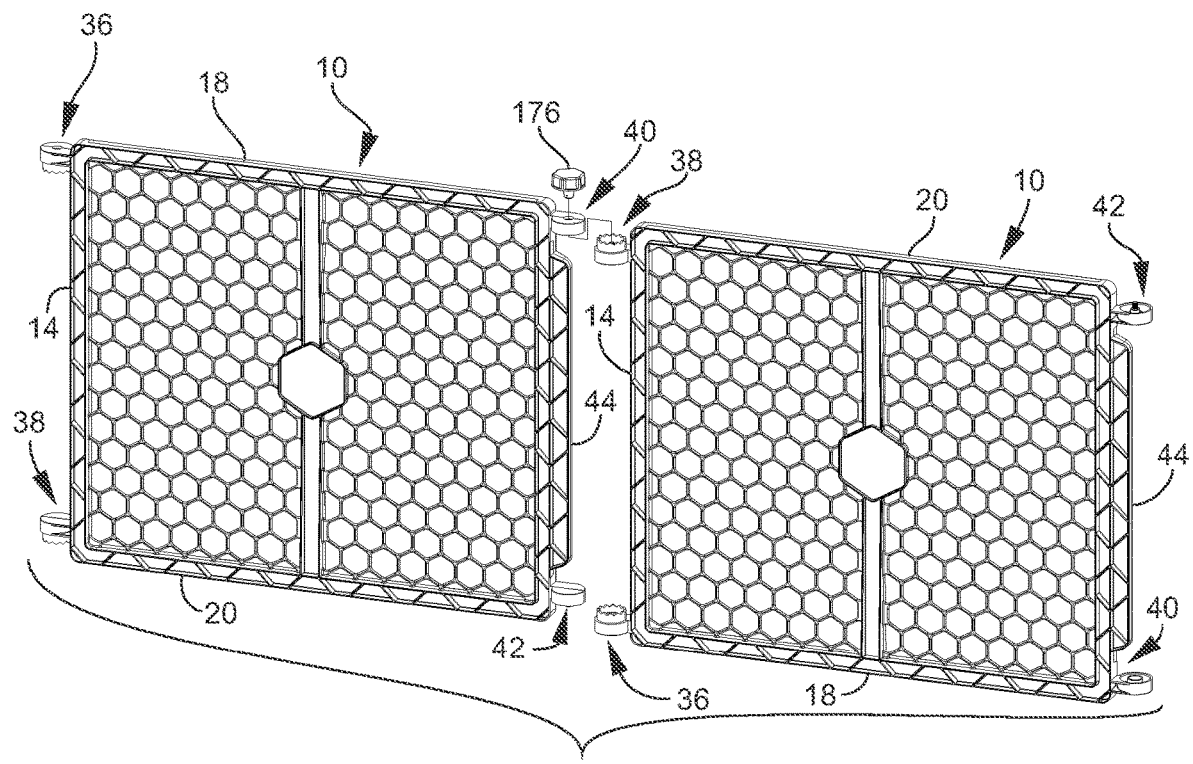
FIG. 6A is a perspective view showing the base unit as positioned in FIG. 2B adjacent to the base unit as positioned in FIG. 2D and further showing a hand wheel for connecting the base units to each other.
Figure 6B:
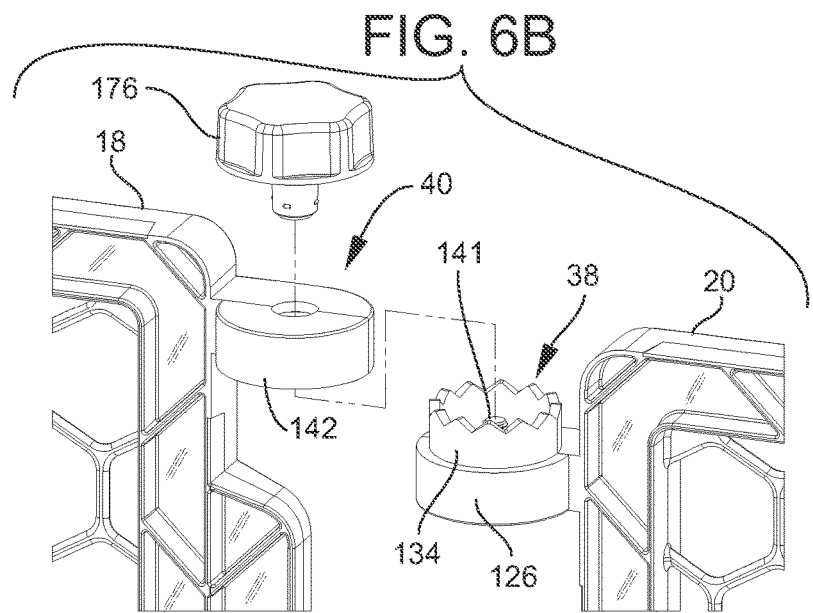
FIG. 6B is a detail perspective view showing the adjacent upper connectors of the base units of FIG. 6A and the hand wheel of FIG. 6A.

The present plastic base unit or panel is indicated by reference numeral 10. Panel 10 includes a frame or periphery 12. Frame 12 includes a left side vertically extending frame member 14, a right side vertically extending frame member 16, an upper horizontally extending frame member 18, and a lower horizontally extending frame member 20. Horizontally extending frame members 18, 20 run to and between the vertically extending frame members 14, 16. Frame members 14, 16, 18, 20 are one-piece and integral with each other such that frame 12 is one-piece and integral. Frame 12 is rectangular. Frame 12 includes a first face 22 and a second face 24. Each of the faces 22, 24 includes first and second planes, respectively, defined by outer edges of frame members 14, 16, 18, 20.

Frame 12 defines an H-channel 26. H-channel 26 may also be referred to as an I-channel. H-channel 26 runs endlessly about the frame 12. H-channel 26 includes a rectangular inner wall 28 that extends to and between the first and second faces 22, 24. A first rectangular outer edge of the inner wall 28 defines a first plane of first face 22. A second rectangular outer edge of the inner wall 28 defines a second plane of the second face 24. The first and second planes of first and second faces 22, 24 are parallel to each other. A network 30 extends from the inner wall 28. A vertical support 32 extends from the inner wall 28.

H-channel 26 includes a rectangular outer wall 34. Rectangular outer wall 34 runs parallel to rectangular inner wall 28. Outer wall 34 extends to and between the first and second planes of the first and second faces 22, 24. A first rectangular outer edge of outer wall 34 also defines the first plane of first face 22 and lies in the first plane of the first face 22. A second rectangular outer edge of outer wall 34 also defines the second plane of second face 24 and lies in the second plane of the second face 24. A left side upper connection 36 extends from the outer wall 34 of the left side frame member 14. A left side lower connection 38 extends from the outer wall 34 of the left side frame member 14. A right side upper connection 40 extends from the outer wall 34 of the right side frame member 16. A right side lower connection 42 extends from the outer wall 34 of right side frame member 16. A vertically extending filler member 44 extends from the outer wall 34 of the right side frame member 16.

The inner wall 28 of frame members 14, 16 lie in vertically extending planes. The outer wall 34 of frame members 14 and 16 lie in vertically extending planes.

The inner wall 28 of frame members 18, 20 lie in horizontally extending planes. The outer wall 34 of frame members 18, 20 lie in horizontally extending planes.

A joining wall 46 runs to and between the inner and outer walls, 28, 34 endlessly about the frame 12. The joining wall 46 defines a third plane such that the joining walls 46 of each of the frame members 14, 16, 18, 20 are disposed in the third plane. The third plane is parallel to the first and second planes of the first and second faces 22, 24. The third plane is intermediate of the first and second planes of the first and second faces 22, 24. Preferably the third plane is equidistant from each of the first and second planes of the first and second faces 22, 24.

Frame 12 includes a set of braces 48 and a set of braces 49. The set of braces 48 run to and between the inner and outer walls 28, 34. The set of braces 49 are corner braces and run between an outer wall 34 of one frame member to an outer wall 34 of an adjacent frame member.

Brace 48 includes an inner end 50 and an outer end 52. Inner end 50 is integral with and terminates at the inner wall 28. Outer end 52 is integral with and terminates at the outer wall 34. As shown in FIG. 3B, brace 48 includes an inner edge 54 and an outer edge 56. Inner edge 54 is integral with and terminates at joining wall 46. Outer edge 56 is free of connection and terminates in one of the first or second planes of the first and second faces 22, 24, also defines one of the first or second planes of the first and second faces 22, 24 and lies in the first or second plane of such first or second face 22, 24. Brace 48 defines a plane.

H-channel 26 includes a first channel 58 and a second channel 60. First channel 58 is separated from second channel 60 by the joining wall 46. First channel 58 opens toward the first face 22. Second channel 60 opens toward the second face 24.

Each of the first and second channels 58, 60 is broken by the set of braces 48. Each of the braces 48 of first channel 58 lies in the same plane as a brace 48 in the second channel 60. Each of the braces 48 in each of the channels 58, 60 is paired with a brace 48 in the other of the channels 58, 60 such that the paired braces 48 lie in a common plane.

Each of the braces 48 extends obliquely relative to inner wall 28 and outer wall 34. "Oblique" means "neither parallel nor at a right angle to a specified or implied line; slanting." Each of the braces 48 is neither parallel to nor at a right angle to the portion of the inner wall 28 and outer wall 34 to which it connects. Each of the braces 48 slants relative to the portions of the inner wall 28 and outer wall 34 to which it connects.

Each of the braces 48 is spaced from an adjacent brace 48. Adjacent braces 48 slant in opposite directions. Adjacent braces 48 lie in respective planes that are disposed at generally a right angle to each other.

Some adjacent braces 48, from the perspective of the inner wall 28, diverge away from each other. Some adjacent braces 48, from the perspective of the inner wall 28, converge toward each other.

Some adjacent braces 48, from the perspective of the outer wall 34, diverge away from each other. Some adjacent braces 48, from the perspective of the outer wall 34, converge toward each other.

As indicated above, braces 49 are corner braces that run between an outer wall 34 of one frame member to an outer wall 34 of an adjacent frame member.

Brace 49 includes first and second outer ends 62, 64. First outer end 62 is integral with and terminates at the outer wall 34 of one frame member. Second outer end 64 is integral with and terminates at the outer wall 34 of an adjacent frame member. Brace 49 includes an inner edge 66 and an outer edge 68. Inner edge 66 is integral with and terminates at joining wall 46. Outer edge 68 is free of connection and terminates in one of the first or second faces 22, 24, also defines one of the first or second planes of the first and second faces 22, 24 and lies in the first or second plane of such first or second face 22, 24. Brace 49 defines a plane.

Each of the first and second channels 58, 60 is unbroken by the set of braces 49. Each of the braces 49 of first channel 58 lies in the same plane as a brace 49 in the second channel 60. Each of the braces 49 in each of the channels 58, 60 is paired with a brace 49 in the other of the channels 58, 60 such that the paired braces 49 lie in a common plane.

Each of the braces 49 extends obliquely relative to the portion of the outer wall 34 to which it connects. Each of the braces 49 is neither parallel to nor at a right angle to the portion of the outer wall 34 to which it connects. Each of the braces 49 slants relative to the portion of the outer wall 34 to which it connects.

Each of the braces 49 is spaced from an adjacent brace 48. Adjacent braces 48, 49 slant in opposite directions. Adjacent braces 48, 49 lie in respective planes that are disposed at generally a right angle to each other.

A pair of first braces 49 is disposed at the curved junction between frame members 14 and 16, with one first brace 49 in channel 58 and the other first brace 49 in channel 60. A pair of second braces 49 is disposed at the curved junction between frame members 16 and 18, with one second brace 49 in channel 58 and the other second brace 49 in channel 60. A pair of third braces 49 is disposed at the curved junction between frame members 18 and 20, with one third brace 49 in channel 58 and the other third brace 49 in channel 60. A pair of fourth braces 49 is disposed at the curved junction between frame members 20 and 14, with one fourth brace 49 in channel 58 and the other fourth brace 49 in channel 60.

The vertical support 32 runs to and between the lower frame member 20 and the upper frame member 18. Vertical support 32 includes a tapering upper H-channel 72 and a tapering lower H-channel 74. Disposed between the lower end of the upper H-channel 72 and the upper end of the lower H-channel 74 is a vertical integral center piece 76.

Each of the H-channels 72, 74 includes a left side vertical wall 78, an opposing right side vertical wall 80, and a connecting wall 82 running between the right and left side vertical walls 78, 80.

Left side vertical walls 78 of the H-channels 72, 74 are disposed in a common plane. Right side vertical walls 80 of the H-channels 72, 74 are disposed in a common plane. Connecting walls 82 of the H-channels 72, 74 are disposed in a common plane.

Each of the left side and right side vertical walls 78, 80 have first and second outer edges. First and second outer edges of the left side vertical wall 78 of the upper H-channel 72 taper toward each other from the upper frame member 18 to the integral center piece 76. First and second outer edges of the left side vertical wall 78 of the lower H-channel 74 taper toward each other from the lower frame member 20 to the integral center piece 76. First and second outer edges of the right side vertical wall 80 of the upper H-channel 72 taper toward each other from the upper frame member 18 to the integral center piece 76. First and second outer edges of the right side vertical wall 80 of the lower H-channel 74 taper toward each other from the lower frame member 20 to the integral center piece 76.

First outer edges of the left side and right side vertical walls 78, 80 of the upper H-channel 72 of first face 22 are straight and define a plane. Such plane is oblique to the first and second planes defined by the outer edges of inner and outer walls 28, 34 of frame members 14, 16, 18, 20.

First outer edges of the left side and right side vertical walls 78, 80 of the upper H-channel 72 of second face 24 are straight and define a plane. Such plane is oblique to the first and second planes defined by the outer edges of inner and outer walls 28, 34 of frame members 14, 16, 18, 20.

First outer edges of the left side and right side vertical walls 78, 80 of the lower H-channel 74 of first face 22 are straight and define a plane. Such plane is oblique to the first and second planes defined by the outer edges of inner and outer walls 28, 34 of frame members 14, 16, 18, 20.

First outer edges of the left side and right side vertical walls 78, 80 of the lower H-channel 72 of second face 24 are straight and define a plane. Such plane is oblique to the first and second planes defined by the outer edges of inner and outer walls 28, 34 of frame members 14, 16, 18, 20.

Upper and lower H-channels 72, 74 run parallel to each of left side and right side frame members 14, 16. Each of the left side and right side vertical walls 78, 80 lies parallel to the inner and outer walls 28, 34 of the left side and right side frame members 14, 16.

Connecting wall 82 of H-channel 72 lies in the same plane as the connecting wall 82 of H-channel 74. Connecting wall 82 lies in the same plane as joining wall 46 of frame members 14, 16, 18, 20.

Integral center piece 76 includes an endless outer wall 84 and a uniting wall 86. Endless outer wall 84 defines, or in the shape of, a hexagon. Endless outer wall 84 extends to each of the first and second faces 22, 24. Endless outer wall 84 has a lesser distance in the lateral or thickness direction than does any of the inner and outer walls 28, 34 of the frame members 14, 16, 18, 20. Endless wall 84 traverses each of the upper H-channel 72 and lower H-channel 74. Uniting wall 86 is coplanar with the connecting wall 82 of the upper and lower H-channels 72, 74 and the joining wall 46 of the frame members 14, 16, 18, 20.

Network 30 extends from the left side vertical wall 78 of each of the H-channels 72, 74 of the vertical support 32. Network 30 extends from the right side vertical wall 80 of each of the H-channels 72, 74 of the vertical support 32. Network 30 extends from a left side of the endless wall 84 of integral center piece 76 of vertical support 32. Network 30 extends from a right side of the endless wall 84 of integral center piece 76 of vertical support 32.

Vertical center piece 76 has a greater width or longitudinal distance than the width or longitudinal distance of H-channels 72, 74. The height of H-channel 72 is generally the same as the height of H-channel 74.

At the upper end of H-channel 72, left side and right side walls 78, 80 have a lateral distance that is the same as the lateral distance that inner wall 28 extends. At the lower end of H-channel 72, left side and right side walls 78, 80 have a lateral distance that is the same as the lateral distance of endless wall 84 of vertical center piece 76.

At the lower end of H-channel 74, left side and right side walls 78, 80 have a lateral distance that is the same as the lateral distance that inner wall 28 extends. At the upper end of H-channel 74, left side and right side walls 78, 80 have a lateral distance that is the same as the lateral distance of endless wall 84 of vertical center piece 76.

Network 30 and vertical support 32 can be referred to as a body of panel 10 that is within the outer frame members 14, 16, 18, 20. Vertical support 32 can also be referred to as a frame member or frame portion of frame 12 as it lends support to and between the upper and lower frame members 18, 20. Vertical support 32 can be referred to as an inner support member 32.

Network 30 is a lattice of hexagonal rings 88. Network 30 defines a plane that is parallel to the first plane of the first face 22 where such first plane is defined by the outer edges of the inner wall 28 of the first face 22 and that is parallel to the second plane of the second face 24 where such second plane is defined by the outer edges of the inner wall 28 of the second face 24. Network 30 is coplanar with each of the joining wall 46 of the frame members 14, 16, 18, 20, the connecting walls of the H-channels 72, 74 and the uniting wall 86 of the integral center piece 76.

Each of the hexagonal rings 88 is of equal size and smaller than the hexagonal endless wall 84 of integral center piece 76. Each of the hexagonal rings 88 includes six straight sides.

A left side first section 90 of the network 30 extends to and between the inner wall 28 of left side frame member 14, the inner wall of upper frame member 18, the left side wall 78 of upper H-channel 72, the left side of endless wall 84, the left side wall 78 of lower H-channel 74, and the inner wall 28 of lower frame member 20.

A right side second section 92 of the network 30 extends to and between the inner wall 28 of right side frame member 16, the inner wall of upper frame member 18, the right side wall 80 of upper H-channel 72, the right side of endless wall 84, the right side wall 78 of lower H-channel 74, and the inner wall 28 of lower frame member 20.

Each of the straight six sides makes up a side of two hexagonal rings 88, except that incomplete rings 94 extend from the inner walls of frame members 14, 16, 18 and 20 and further extend from the left and right sides of the integral center piece 76, except that rings 88 adjacent to the upper and lower H-channels 72, 74 share an elongate integral vertical extension 96 between a vertical straight side of a ring 88 and the left side and right side walls 78, 80 of the H-channels 72, 74, and except that each of the corners of each of the left and right network sections 90, 92 have a corner integral extension 98.

Filler member 44 is integral with and runs along a portion of the right side frame member 16. Filler member 44 fills a portion of a space between two engaged panels 10 so as to minimize the chance of a cat or small pet squeezing between adjacent frame members of adjacent panels 10.

Filler member 44 includes a U-shaped outer wall 100 that extends from the outer wall 34 of frame member 16. Filler member 44 terminates vertically short of, and is spaced from, each of the connectors 40, 42. Filler member 44 terminates horizontally just short of the pivoting axis of connectors 40, 42.

Filler member 44 includes a linking wall 102 that runs between the outer wall 34 of frame member 16 and the U-shaped outer wall 100. Linking wall 102 is coplanar with joining wall 46 of frame members 14, 16, 18, 20, connecting walls 82 of H-channels 72, 74, and uniting wall 86 of the integral center piece 76.

Filler member 44 includes a set of braces 104. Each of the braces 104 extends from the outer wall 34 of frame member 16 to the U-shaped wall 100. Each of the braces 104 on face 22 is paired with, and coplanar with, a brace on face 24.

Each of the braces 104 is oblique relative to the outer wall 34 of frame member 16. Each of the braces 104 is spaced from at least one other brace 104. Adjacent braces 104 have alternating slants or inclines. From the perspective of the frame member 16, some of adjacent braces 104 diverge away from frame member 16 and away from each other. From the perspective of the frame member 16, other adjacent braces 104 converge toward each other and toward frame member 16. Each of the braces 104 is matched with a brace 48 of H-channel 26. Each of the braces 104 leads into a brace 48 of H-channel 26, which brace 48 then slants oppositely of such brace 104.

Filler member 44 tapers as a whole from frame member 16 to the straight upright wall portion 106 of U-shaped outer wall 100 such that braces 104 also taper such that the lateral depth of straight upright wall portion 106 is less than the lateral depth of outer wall 34 of frame member 16.

The width or longitudinal distance between straight upright wall portion 106 and outer wall 34 of frame member 16 is greater than the width or longitudinal distance between outer wall 34 of frame member 16 and inner wall 28 of frame member 16.

The left side upper connector 36 includes a base cylinder 108. Upper and lower plates 110, 112 extend integrally from the base cylinder 108 to the left side frame member 14 to engage the base cylinder 108 to the left side frame member 14. Base cylinder 108 includes a top 114 having a central circular opening 116. The top 114 of base cylinder 108 is spaced from and adjacent to a plane defined by the outer wall of frame member 18. Base cylinder 108 includes an interface or inwardly extending face 117 for sliding against an annular face of another connector. Depending from base cylinder 108 is a toothed cylinder 118 having a toothed lower annular end 120 having a set of twelve teeth 122. The outside diameter of base cylinder 108 is greater than the outside diameter of toothed cylinder 118. Depending from top 114, inside of base cylinder 108, and inside of toothed cylinder 118 is an inner cylinder 124 that is in communication with opening 116. Inner cylinder 124 includes an open end that is disposed between the toothed annular end 120 and the open end of base cylinder 108. Cylinders 108, 118 and 124 are coaxial and include a common axis. This common axis is offset from the plane of the joining wall 46 of the frame members 14, 16, 18, 20 and is disposed in the plane defined by the outer edges of the inner and outer walls 28, 34 of second face 24. One-half of each of cylinders 108, 118, 124 is disposed beyond the plane defined by the outer edges of the inner and outer walls 28, 34 of second face 24 and one-half of each of the cylinders 108, 118, 124 is disposed between the plane defined by the outer edges of the inner and outer walls 28 of second face 24 and the outer walls of the plane defined by the outer edges of the inner and outer walls 28 of first face 22. Base cylinder 108 includes a diameter equal to twice the lateral depth of outer wall 36.

The left side lower connector 38 includes a base cylinder 126. Upper and lower plates 128, 130 extend integrally from the base cylinder 126 to the left side frame member 14 to engage the base cylinder 126 to the left side frame member 14. Base cylinder 126 includes a closed top 132. Base cylinder 126 includes an interface or inwardly extending annular face 133 for sliding against the annular face of another connector. Extending from base cylinder 126 is a toothed cylinder 134 having a toothed lower annular end 136 having a set of twelve teeth 138. The outside diameter of base cylinder 126 is greater than the outside diameter of toothed cylinder 134. Extending from top 132, and disposed inside of base cylinder 126, is a pin mount 140 for a threaded metal pin 141. The top 132 of connector 38 is a closed top so as to embed pin 141 in connector 38. The proximal end of pin mount 140 includes a hexagonal receptor 139 for a hexagonal head of the threaded metal pin 141 to minimize turning of the threaded metal pin 141. The distal end of pin mount 140 is cylindrical for receiving a shaft portion of the metal pin 141. The distal end of the threaded metal pin 141 and a threaded shaft portion of the metal pin 141 extend beyond the distal end of the mount 140. The distal open end of pin mount 140 is disposed between the toothed annular end 136 and the open end of base cylinder 126. Cylinders 126 and 134, pin mount 140, and metal pin 141 are coaxial and include a common axis. This common axis is offset from the plane of the joining wall 46 of the frame members 14, 16, 18, 20 and is disposed in the plane defined by the outer edges of the inner and outer walls 28, 34 of second face 24. One-half of each of cylinders 126 and 134, pin mount 140, and metal pin 141 is disposed beyond the plane defined by the outer edges of the inner and outer walls 28, 34 of second face 24 and one-half of each of cylinders 126 and 134, pin mount 140, and metal pin 141 is disposed between the plane defined by the outer edges of the inner and outer walls 28 of second face 24 and the outer walls of the plane defined by the outer edges of the inner and outer walls 28 of first face 22. Base cylinder 126 includes a diameter equal to twice the lateral depth of outer wall 36. Base cylinder 108, base cylinder 126, toothed cylinder 118, toothed cylinder 134, circular opening 116, pin mount 140, and metal pin 141 are all coaxial.

The right side upper connector 40 includes a base cylinder 142. Upper and lower plates 144, 146 extend integrally from the base cylinder 142 to the right side frame member 16 to engage the base cylinder 142 to the right side frame member 16. Base cylinder 142 includes a top 148 having a circular opening 150. Base cylinder 142 includes a rim or interface or annular face 151 for sliding against the annular face of another connector. An inner cylinder 152 is disposed within base cylinder 142 and extends integrally from top 148. Each of the base cylinder 142 and inner cylinder 152 has an open end disposed at the same elevation. A circular channel 154 is disposed between the base cylinder 142 and inner cylinder 152. A set of twelve annular disposed teeth 156 is disposed in channel 154. Teeth 156 abut up against the inner cylindrical wall of base cylinder 142. Circular opening 150 has a lesser diameter than the inside diameter of inner cylinder 152 such that, at the top of inner cylinder 152, an annular portion 158 of top 148 partially closes off the top open end of inner cylinder 152. Base cylinder 142, circular opening 150, inner cylinder 152, and annularly disposed teeth 156 are coaxial so as to include a common axis. This common axis is offset from the plane of the joining wall 46 of the frame members 14, 16, 18, 20 and is disposed in the plane defined by the outer edges of the inner and outer walls 28, 34 of first face 22. One-half of each of cylinders 142, 152 and annularly disposed teeth 156 is disposed beyond the plane defined by the outer edges of the inner and outer walls 28, 34 of first face 22 and one-half of each of the cylinders 142 and 152 and one-half of annularly disposed teeth 156 is disposed between the plane defined by the outer edges of the inner and outer walls 28 of first face 22 and the outer walls of the plane defined by the outer edges of the inner and outer walls 28 of second face 24. Base cylinder 142 includes a diameter equal to twice the lateral depth of outer wall 36.

The right side lower connector 42 includes a base cylinder 160. Upper and lower plates 162, 164 extend integrally from the base cylinder 160 to the right side frame member 16 to engage the base cylinder 160 to the right side frame member 16. Base cylinder 160 includes a closed top 166. Base cylinder 160 includes a rim or interface or annular face 167 for sliding against an annular face of another connector. A hexagonal base 168 is engaged to the underside of the top 166 and includes a hexagonal receptor for receiving a hexagonal head of a threaded metal pin 169. The top 166 of connector 42 is a closed top so as to embed pin 169 in connector 42. A pin shaft receiver 170 is mounted on the hexagonal base 168 for receiving the shaft of threaded metal pin 169. A portion of the threaded shaft of threaded metal pin 169 and the distal threaded end of threaded metal pin 169 extend beyond the open distal cylindrical end of the pin shaft receiver 170. A set of twelve annularly disposed teeth 172 extend from the underside of the top 166. Teeth 172 abut up against the inner cylindrical wall of base cylinder 160. Each of the base cylinder 160 and pin shaft receiver 170 has an open end disposed at generally the same elevation. The open end of pin shaft receiver 170 may be set back slightly of the open end of base cylinder 160. Teeth 172 are spaced from hexagonal base 168 so as to form a channel 174 therebetween. Base cylinder 160, hexagonal pin head base 168, threaded metal pin 169, pin shaft receiver 170, and annularly disposed teeth 172 are coaxial so as to include a common axis. This common axis is offset from the plane of the joining wall 46 of the frame members 14, 16, 18, 20 and is disposed in the plane defined by the outer edges of the inner and outer walls 28, 34 of first face 22. One-half of each of base cylinder 160, hexagonal pin head base 168, threaded metal pin 169, pin shaft receiver 170 and annularly disposed teeth 172 is disposed beyond the plane defined by the outer edges of the inner and outer walls 28, 34 of first face 22 and one-half of each of base cylinder 160, hexagonal pin head base 168, threaded metal pin 169, pin receiver 170 and annularly disposed teeth 172 is disposed between the plane defined by the outer edges of the inner and outer walls 28 of first face 22 and the outer walls of the plane defined by the outer edges of the inner and outer walls 28 of second face 24. Base cylinder 160 includes a diameter equal to twice the lateral depth of outer wall 36. Base cylinder 142, inner cylinder 152, annularly disposed teeth 156, base cylinder 160, hexagonal pin head base 168, threaded metal pin 141, pin shaft receiver 170, and annularly disposed teeth 172 are all coaxial.

Connector 36 is a male connector and includes annularly arranged exposed teeth 122. Connector 38 is a male connector and includes annularly arranged exposed teeth 138. Connectors 36, 38 are disposed on the same end frame member 14 so as to be disposed on the same end of the panel 10.

Connector 40 is a female connector and includes annularly arranged hidden teeth 156. Connector 42 is a female connector and includes annularly arranged hidden teeth 172. Connectors 40, 42 are disposed on the same end frame member 16 so as to be disposed on the same end of the panel 10.

A single panel 10 may by itself work as a barrier, such as at the top of a staircase.

Two or more panels 10 may be engaged together to be employed as a barrier, such as between two vertical surfaces. Two or more panels 10 when engaged to each other may form a structure that is self-standing or free standing. For example, two panels may form the shape of a V.

Three or more panels 10 may be engaged together to be employed as a barrier, such as an inside or outside barrier or fence, or as a playyard where an enclosure is formed. Three or more panels 10 when engaged to each other may form a structure that is self-standing or free standing. For example, six panels may form a hexagonal playyard.

Whatever the structure that a set of panels 10 make up, such structure has but one base unit. This base unit is the panel 10.

Connectors 38, 40 are diagonally opposite or situated obliquely relative to each other on a single panel 10. This is a kitty-cornered, catty-cornered, or cater cornered relationship. A connector 38 of a first panel 10 engages a connector 40 of a second panel 10.

Connectors 36, 42 are diagonally opposite or situated obliquely relative to each other on a single panel 10. This is a kitty-cornered, catty-cornered, or cater cornered relationship. A connector 36 of a first panel 10 engages a connector 42 of a second panel 10.

A first hand wheel 176 engages or pinches or draws connectors 38, 40 together. Connectors 38 include teeth 138 and connector 40 includes teeth 156. When connectors 38, 40 are engaged, such a connection may pivot or be fixed from pivoting. When connectors 38, 40 are engaged, teeth 138, 156 may be spaced from each other such that such connection freely pivots, loosely engaged with each other such that incremental pivot positions can be felt by the human hand when pivoting two adjacent panels 10, or tightly engaged with each other such that connectors 36, 42 are fixed from pivoting.

A second hand wheel 176 engages or pinches or draws connectors 36, 42 together. Connectors 36 include teeth 122 and connector 42 includes teeth 172. When connectors 36, 42 are engaged, such a connection may pivot or be fixed from pivoting. When connectors 36, 42 are engaged, teeth 122, 172 may be spaced from each other such that such connection freely pivots, loosely engaged with each other such that incremental pivot positions can be felt by the human hand when pivoting two adjacent panels 10, or tightly engaged with each other such that the connectors 36, 42 are fixed from pivoting.

Hand wheel 176 generally includes a knob 178, a shaft 180, and a threaded metal pin receiver 182 that is set in the distal end of shaft 180. Knob 178 is hand sized so as to be manipulated by the hand or so as to fit in the palm of the hand or so as to be manipulated by the fingers of a hand. Knob 178 is receptacle shaped so as to include an exterior flat top 184 and a peripheral sidewall 186. Peripheral sidewall 186 is undulating and includes protuberances so as to minimize slippage in the human hand and so as to form depressions that may be engaged by the fingers of a human hand. The knob 178 further includes a flat smooth annular face 188 for rotationally sliding on a flat smooth face of a connector such as the top or outside face 148 of connector 40 or the top or outside face 114 of connector 36.

The proximal end of shaft 180 extends from the underside of flat top 184. Radial plate like supports 190 extend from the inside of the peripheral sidewall 186 to the shaft 180. Shaft 180 is cylindrical and fixedly receives therein the threaded metal pin receiver 182. Pin receiver 182 includes a threaded opening that engages metal pin 141 or metal pin 169.

A distal end portion of shaft 180 includes a set of four tabs 192 that are axially spaced from the absolute distal end of shaft 180, radially disposed about the shaft 180, and radially extending from the main cylindrical exterior surface of the shaft 180. Tabs 192 provide a retaining function. Shaft 180 is frictionally inserted into opening 116 of connector 36 or opening 150 of connector 40 because the outside diameter of tabs 192 is slightly greater than the diameter of openings 116, 150. Once inserted, shaft 180 and hand wheel 176 freely rotates relative to openings 116, 150 because tabs 192 have been pushed beyond the thickness of the plastic portion that forms the openings 116, 150. Hand wheel 176 is retained in connectors 36, 40 because the outside diameter of tabs 192 is slightly greater than the diameter of openings 116, 150 such that accidental loss of hand wheel 176 is minimized.

As to the combination of the connectors 36, 42, toothed male cylinder 118 of connector 36 of a first panel 10 is inserted into the female cylinder 160 of connector 42 of a second panel 10. Hand wheel 176, after being inserted into opening 116 of connector 36, engages threaded metal pin 169 of connector 42. Then hand wheel 176 is turned so as to draw up threaded metal pin 169 and so as to draw up the teeth 172 of connector 42 into engagement with teeth 122 of connector 36.

As to the combination of the connectors 38, 40, toothed male cylinder 134 of connector 38 of a first panel 10 is inserted into the female cylinder 142 of connector 40 of a second panel 10. Hand wheel 176, after being inserted into opening 150 of connector 40, engages threaded metal pin 141 of connector 38. Then hand wheel 176 is turned so as to draw up threaded metal pin 141 and so as to draw up the teeth 138 of connector 38 into engagement with teeth 156 of connector 40.

Where a panel 10 is to be connected to a wall or other vertical surface, a bracket 200, a wall mount 202 and a swing lock 204 are employed.

Bracket 200 is integral and one-piece. Bracket 200 includes first and second jaws 206, 208 that extend at a right angle from a base 210. Each of the jaws 206, 208 is plate like. Each of the jaws 206, 208 has a pair of triangular supports 212, where a first triangular support 212 extends between an upper edge of the respective jaw and an upper portion of base 12 and where a second triangular support 212 extends between a lower edge of the respective jaw and a lower edge of base 12. Each of the jaws 206, 208 has a stepped distal end or an undulating distal end where a final step or center portion 214 is the portion of the jaw that extends beyond inner wall 28 such that a finger can pry up the jaw having the center portion 214. An underside of center portion 214 and an underside of straight edges 216 abut the outer edge of inner wall 28. Each of the jaws 206, 208 includes a set of ridges 218. The outer ridges 218 have a tapering body and a tapered distal end. The center ridge 218 has parallel straight sides and a right angled end. The two ridges 218 between the outer ridges 218 and the center ridge 218 have tapered bodies and a straight end aligned with and in a straight line with the ends of the center ridge 218. The three middle ridges 218 have lead-ins or distal end portions that are tapered from the interior main surface of the jaw to a straight top edge of the respective middle ridge 218. All of the ridges 218 have the same height. The ridges 218 snap into an opening in one of the channels 58, 60 of H-channel 26, where such an opening is defined by two adjacent braces 48, where such adjacent braces 48 converge from the outer wall 34 to the inner wall 28. Ridges 218 do not snap into the openings that are defined by adjacent braces 48 diverging from outer wall 34. The proximal ends of ridges 218 define a straight line and confront outer wall 34 when the jaws 206, 208 are engaged. The distal ends of ridges 218 confront inner wall 28 when the jaws 206, 208 are engaged. Each of the outer two ridges 218 confronts one adjacent converging brace 48. The tapering distal ends of the middle three ridges 218 aid in an expansion or drawing apart of the jaws 206, 208 as the jaws 206, 208 slide over the outer edges of the outer wall 34. The distance between the interior surfaces of the jaws 206, 208 is slightly less than the lateral depth of inner and outer walls 28, 34 of panel 10 such that the jaws 206, 208 resiliently clamp onto each of the inner and outer walls 28, 34. The depth of each of the jaws 206, 208 is measured from the outer edge or distal edge of center portion 214 to the inner surface of base 210. Such depth is sufficient for the jaws 206, 208 to receive therein filler member 44. When jaws 206, 208 engage frame member 14 that has no filler member 44, the triangular supports 212 engage nothing and terminate short of outer wall 34. When jaws 206, 208 engage filler member 44 and support member 16, the triangular supports 212 confront and engage the outer edges of the straight wall portion 106 of U-shaped outer wall 100 of filler member 44.

Upper and lower plate like extensions 220 extend rearwardly from upper and lower portions of base 210, where jaws 206, 208 extend from a front side of the base 210. The main leaf like or plate like portions of jaws 206, 208 generally define respective vertical planes. Plate like extensions 220 generally define respective vertical planes. Jaws 206, 208 extend parallel to each other. Plate like extensions 220 extend parallel to each other. Plate like extensions 220 define planes that are disposed at right angles to planes defined by jaws 206, 208. Plate like extensions 220 may or may not be tapered and, if tapered, the upper and lower surfaces taper away from base 210 and toward each other and the distal end of extension 220. Depending from distal end portions of the plate like extensions 220 are respective nubs or pivot pins 222. Plate like extension 220 includes a pair of edges 223 tapering toward each other from the base 210 to provide for an almost 180 degree of swing of bracket 200 and panel 10 relative to wall mount 202.

Wall mount 202 includes a rectangular base 224 that includes a pair of upper and lower pin or screw openings 226 to fasten the wall mount 202 to a vertical surface such as a wall. The rear of wall mount 202 is receptacle like and includes a rectangular wall and a recessed interior. The rear of wall mount 202 further includes a pair of bosses supporting pin openings 226. Wall mount 202 further includes a pair of frontwardly extending upper and lower U-shaped platforms 228, where the distal end of each of the platforms 228 includes a nub or pivot pin opening 230 for pivotally engaging the nub or pivot pin 222 of bracket 200. A plate like support 232 extends frontwardly from base 224 and is integral with and immediately underneath of U-shaped platform 228 to provide support for U-shaped platform 228 upon which bracket 200 rides. Wall mount 202 further includes a box like upper end 234 having front edge 236. Front edges 236 work as stops for tapering edges 223 of bracket 200 when bracket 200 is swung from side to side. The undersides of bracket extensions 220 ride on the top sides of U-shaped platforms 228. Wall mount 202 includes a pivot pin opening 238 extending vertically in the box like upper end 234.

Swing lock 204 is pivotally engaged with pivot pin 240 to wall mount 202. Swing lock 204 is a retainer that keeps the bracket 200 on the wall mount 202. Swing lock 204 is swingable to an out-of-the-way position such that bracket 200 may be removed from the wall mount 202.

Swing lock 204 includes a proximal end with a through opening 242 for receiving pivot pin 240. A boss surrounds opening 242. An intermediate plate like portion 244 extends from the proximal end and leads into a distal end 246 that is disposed at a lower level than the intermediate portion 244. By disposing the distal end 246 at a lower level than the intermediate portion 244, a greater portion of a ridge 248 is exposed so as to make it easier for a finger to push against the face of the ridge 248 to push the swing lock 204 to one side or the other. The ridge 248 extends longitudinally on the swing lock 204 and rises above the intermediate portion 244 as well as above the plate like distal end 246. Intermediate portion 244 and distal end portion 246 run parallel to each other. Distal end 246 is in the nature of a step, intermediate portion 244 is in the nature of a step, and a plate like portion in the nature of a riser is disposed between the intermediate portion 244 and distal end 246. In use, the portion of extension 220 immediately above nub 222 is disposed between or pinched between the distal end 246 and the upper surface of platform 228 such that bracket 200 is not liftable out of the wall mount 202 without destroying the integrity of either the wall mount 202 or the bracket 200.

In operation, to connect a first unit or panel 10 to a second unit of panel 10, where each of the units 10 are disposed in the same position or orientation with connectors 38 and 42 confronting the ground or floor and connectors 36 and 38 are disposed on the left hand side, a first step is to flip the second unit 10 such that connectors 36 and 40 are confronting the ground or floor. Then the first and second units 10 are brought end to end such that connectors 40 and 42 of the first unit 10 confront the connectors 38 and 36 of the second unit, respectively.

When connector 40 of the first panel 10 confronts the connector 38 of the second panel 10 and both units 10 are resting on a level floor, the annular surface 151 of base cylinder 142 of connector 40 will be in the same plane as the annular surface 133 of the base cylinder 126 of connector 38 of the second unit 10. In other words, as to one base unit 10, annular surface 151 of connector 40 is spaced a vertical distance from a plane having the outer face of outer wall 34 of frame member 20 therein by a first distance and annular surface 133 of connector 38 is spaced from a plane having the outer surface of outer wall 34 of frame member 18 therein by the same first distance.

When connector 42 of the first panel 10 confronts the connector 36 of the second panel 10 and both units 10 are resting on a level floor, the annular surface 167 of base cylinder 160 of connector 42 will be in the same plane as the annular surface 117 of the base cylinder 108 of connector 36 of the second unit 10. In other words, as to one base unit 10, annular surface 167 of connector 42 is spaced a vertical distance from a plane having the outer face of outer wall 34 of frame member 18 therein by a first distance and annular surface 117 of connector 36 is spaced from a plane having the outer surface of outer wall 34 of frame member 20 therein by the same first distance.

Then, with the first and second base units 10 end to end, the first base unit 10 having connectors 40 and 42 on the top and bottom, respectively, is lifted up and then moved sideways so as to locate connectors 40 and 42 directly over connectors 38 and 36, respectively, of the second unit 10. Then, at the same time, the female cylinder 142 of connector 40 and the female cylinder 160 of connector 42 are let down over male toothed cylinder 134 of connector 38 and male toothed cylinder 118 of connector 36, respectively, such that that male cylinders 134, 118 are received in the female cylinders 142, 160, respectively, until the internal teeth 156 of female cylinder 142 engage the external teeth 138 of male cylinder 134 and until the internal teeth 172 of female cylinder 160 engage the external teeth 122 of male cylinder 118. At this point in time, all teeth 156, 138, 172, 122 are hidden from view and are essentially internal. Teeth 156 and 138 engage at essentially the same time as teeth 172, 122 engage. At this time, the outer surface of outer wall 34 of frame member 20 of the first base unit 10 rests on the floor and the outer surface of outer wall 34 of frame member 18 of the second base unit 10 rests on the floor.

Then, unless hand wheel 176 has already been engaged to the first base unit 10, hand wheel 10 is engaged to connector 40 through opening 150 in the top 148 of female cylinder 142. Since the outer ends of diametrically opposite tabs 192 provide an outside diameter slightly greater than the diameter of opening 150, hand wheel shaft 180 snaps in and is retained from falling out such as under the influence of gravity, but the hand wheel 176 is snappingly removable from opening 150 by virtue of the tabs 192. Hand wheel 176 then engages pin 141 and the hand wheel 176 can be turned so as to draw the connectors 40, 38 together. As the hand wheel 176 is turned, the connectors 42 and 36 also are drawn together. There is no need for a second hand wheel 176 at the location provided by connectors 42 and 36, but a second hand wheel 176 could be used at such a location if desired and be inserted into connector 36 from below.

If the first unit 10 and the second unit 10 are already at the desired angular orientations relative to each other, then hand wheel 176 is turned until hand wheel 176 is tight. Here teeth 156 of female cylinder 142 and teeth 138 of male cylinder 134 are tightly engaged and teeth 172 of female cylinder 160 and teeth 122 of male cylinder 118 are tightly engaged.

If the first unit 10 and the second unit 10 are not at the desired angular orientation relative to each other after the hand wheel 176 has been inserted past the tabs 192, the first and second base units 10 may be pivoted as a whole relative to each other before the hand wheel 176 is turned or after the connectors 40, 38 and 42, 36 have been somewhat drawn together. In such a loose connection, teeth 156 and teeth 138 can move axially and rotate against each other and teeth 172 and teeth 122 can move axially and rotate against each other at the same time. In other words, teeth 156 and 138 slide up and down and over each other and teeth 172 and teeth 122 slide up and down and over each other. Then, after the first and second base units 10 have been pivoted as a whole to the desired orientation, the hand wheel 176 can be turned and tightened to fix the first and second base units 10 at such orientation.

Then, to fix a third base unit 10 to the free end of the second base unit 10, the top and bottom connectors 36, 38, respectively, of the third base unit 10 are brought into an engaging relationship with the top and bottom connectors 42, 40, respectively, of the second base unit 10, where the male cylinder 118 of connector 36 is pushed into the female cylinder 160 of connector 42, where the male cylinder 134 of connector 38 is pushed into the female cylinder 142 of connector 40, where teeth 172, 122 engage, and where teeth 156, 138 engage. Then a hand wheel 176 is snapped into opening 116 of connector 36 and tightened if the second and third units 10 have been pivoted to their desired positions.

Then, a fourth base unit 10 may be fixed to the free end of the third base unit. Here the free end of the third base unit 10 will have connector 40 disposed at the top and connector 42 disposed at the bottom so as to engage top and bottom connectors 38, 36, respectively of the fourth base unit 10. Then, as before, a hand wheel 176 is used to tighten the connectors 40, 38 at the top and connectors 42, 36 at the bottom.

Then, to form an endless enclosure such as a playyard, where the playyard has four sides, the free end of the fourth base unit 10 having top and bottom connectors 42, 40 is brought into a confronting relationship with the free end of the first base unit 10 having top and bottom connectors 36, 38. Then connector 42 of the fourth base unit 10 is engaged to connector 36 of the first base unit 10 and connector 40 of the fourth base unit is engaged to the connector 38 of the first base unit 10. A hand wheel 176 is then snapped into the opening 116 of connector 36 and tightened so as to engage teeth 122, 172 to each other and teeth 156, 138 to each other. Such forms a four sided playyard, and six, eight, ten, twelve (and so on) sided playyards or endless enclosures may be set up in this manner.

Playyard or endless enclosures having an odd number of sides such as three, five, seven (and so on) sides may be used by substituting the base unit 10B, shown in FIG. 16, for any of the base units 10. Base unit 10B is identical to base unit 10 except that the right side connectors 40, 42 of the base unit 10 are switched with each other and turned upside down such that a connector 42B is the upper connector and aligned with upper connector 36 of base unit 10B and such that a connector 40B is the lower connector and aligned with lower connector 38 of base unit 10B. Connectors 36, 38 are coaxial and have an axis disposed in the second plane of base unit 10B and connectors 42B, 40B are coaxial and have an axis disposed in the first plane of base unit 10B such that the suitcase configuration of FIG. 5B can be made where all of the units are base unit 10 except for one unit that is base unit 10B. Connector 42B is identical to connector 42 except for its location and its orientation and connector 40B is identical to connector 40 except for its location and orientation. Thus, to make a five sided playyard, four base units 10 are engaged as described above such that the free end of the fourth base unit 10 includes upper connector 42 and lower connector 40, which free end connectors 42 and 40 are engaged to connectors 36 and 38, respectively, of base unit 10B. Base unit 10B now has, as free end connectors, upper connector 42B and lower connector 40B, which free end connectors engage free end upper and lower connectors 36, and 38, respectively, of the first base unit 10 to form the five sided playyard or endless enclosure.

To form a barrier or a fence such as shown in FIG. 9A or 9B, a playyard or endless enclosure may be disengaged at one set of four engaged connectors. Then the free ends of the formerly endless enclosure are drawn apart from each other and the chain of base units 10 (perhaps including one base unit 10B) may be moved as a whole with the other sets of four engaged connectors remaining engaged to each other, provided that one or more hand wheels 176 are loosened, though endless enclosures may be built without hand wheels 176 being fully tightened. Then the resulting structure having two free ends may be formed into a self-standing structure as shown in FIG. 9A. Or one or both of the free ends of the resulting structure can be engaged to a wall using the bracket 200, the wall mount 202 and the swinging lock 204. Bracket 200 is pushed over one of the free ends, with such free end being frame member 14 or frame member 16 having filler member 44 until the ridges 248 snap between two converging braces 48 tapering toward each other from the outer wall 34 to the inner wall 28. Bracket 200 cannot snap onto filler member 44 because the filler member 44 has a tapering depth less than the depth of H-channel 26. One or more brackets 200 may be employed on one free end frame member 14 or 16. Then the swing locks 204 are swung to an out-of-the-way position and then the pivots or nubs 222 of the brackets 200 may be set into the pivot openings 230 of the wall mounts 202, whereupon the swing locks 204 may be swung to confront the upper sides of the extensions 220 to keep the brackets 200 retained in their respective wall mounts 202. Then, if desired, the barrier or fence so employed with the wall mounts 202 may act as a gate because the wall mount 202/bracket 200 connection can easily, in the nature of a quick connect, be disengaged with or without use of the swing lock 204, thereby permitting passage between the wall mount 202 and bracket 200. Furthermore, each of the hand wheels 176 is in the nature of a quick connect and can quickly be removably from the set of upper connectors 38, 40 or from the set of upper connectors 36, 42 such that a playyard, endless enclosure, barrier, or fence can be disengaged at any set of upper and lower connectors 38, 40, 42, 36 to permit passage therethrough at such a location.

Figure 8:
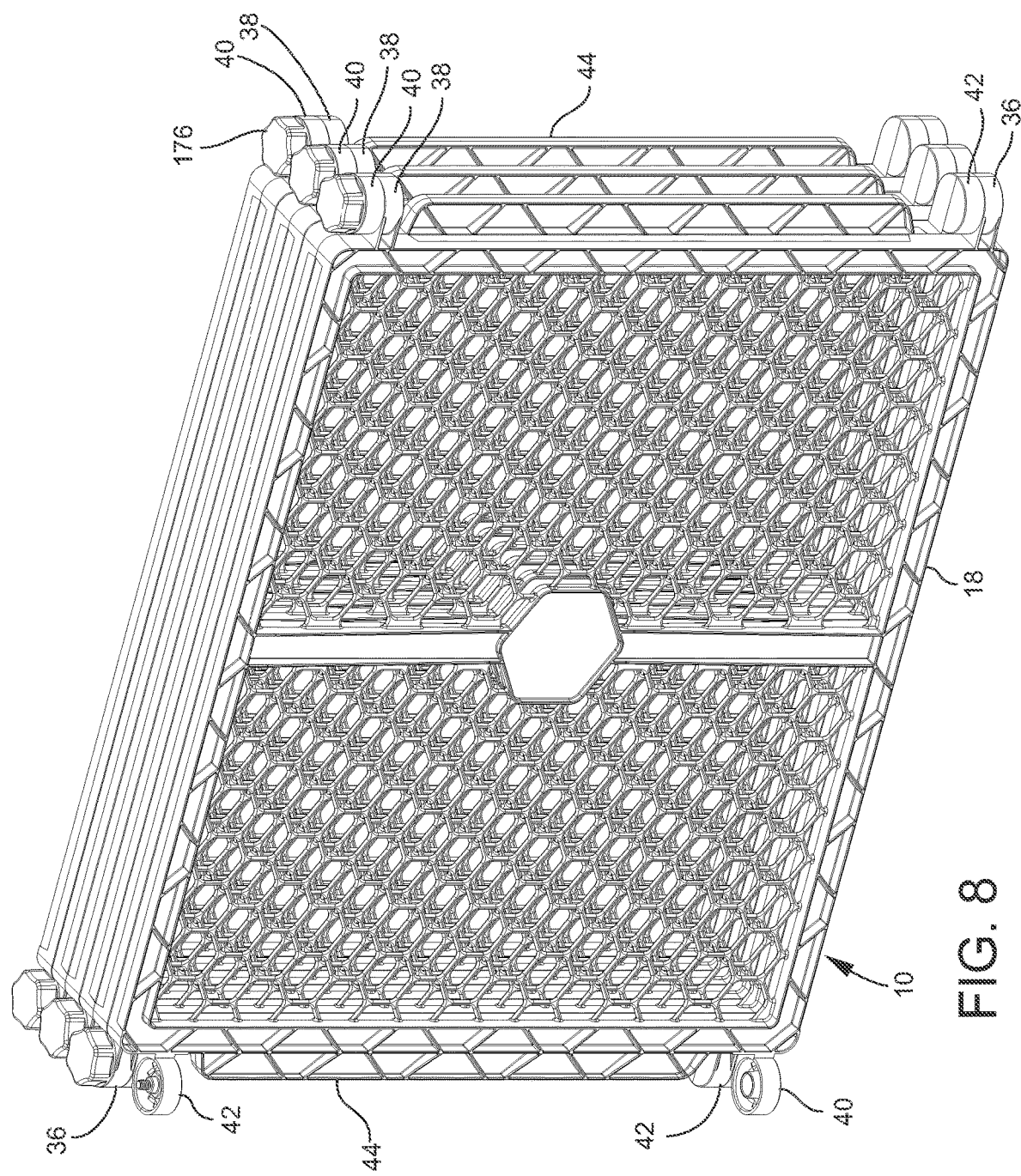
FIG. 8 is a detail view of FIG. 5B that shows six base units parallel to each other in a compact suitcase-like form.
Figure 14:
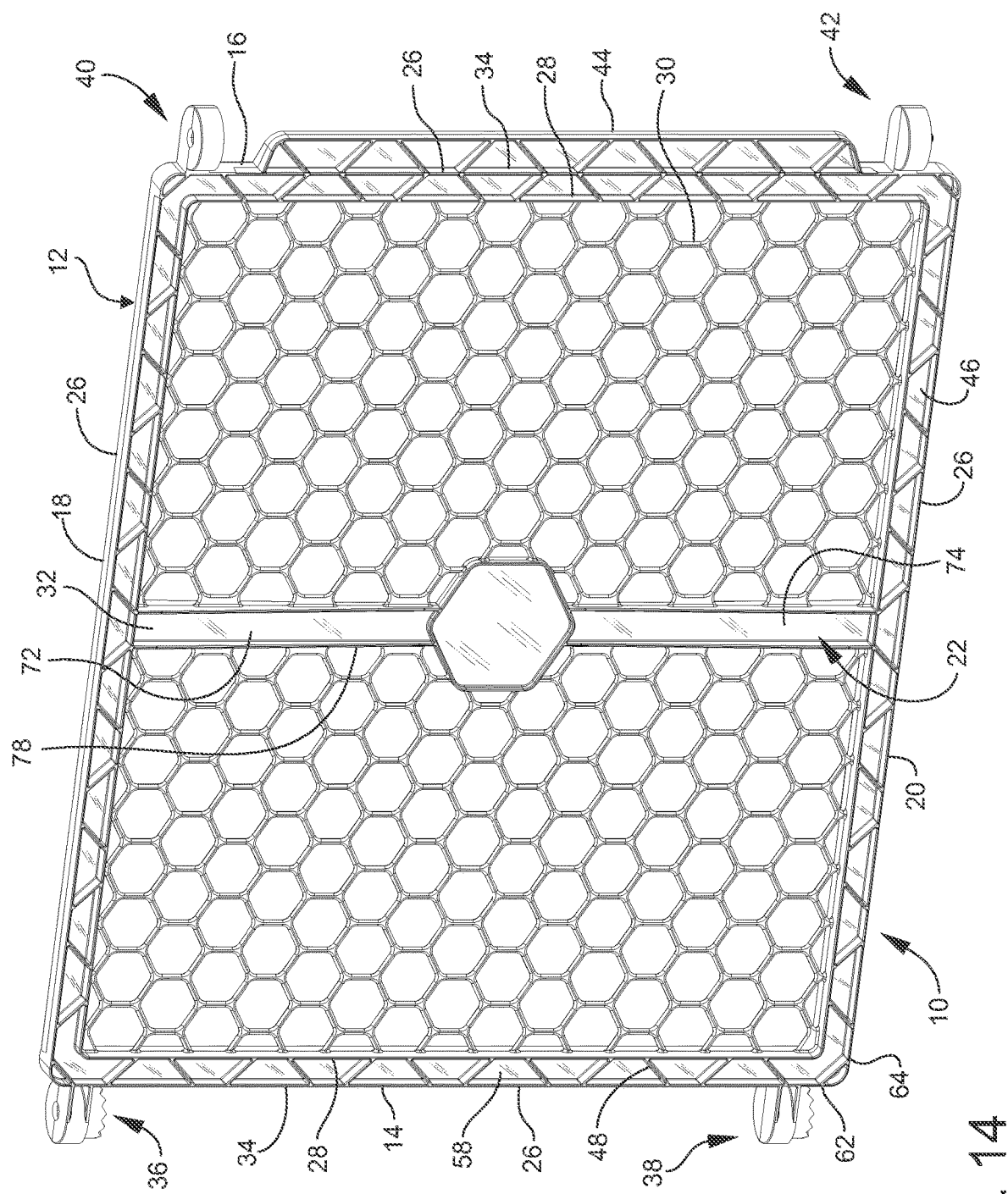
FIG. 14 is a front perspective view of the base unit of FIG. 2B.
Figure 15:
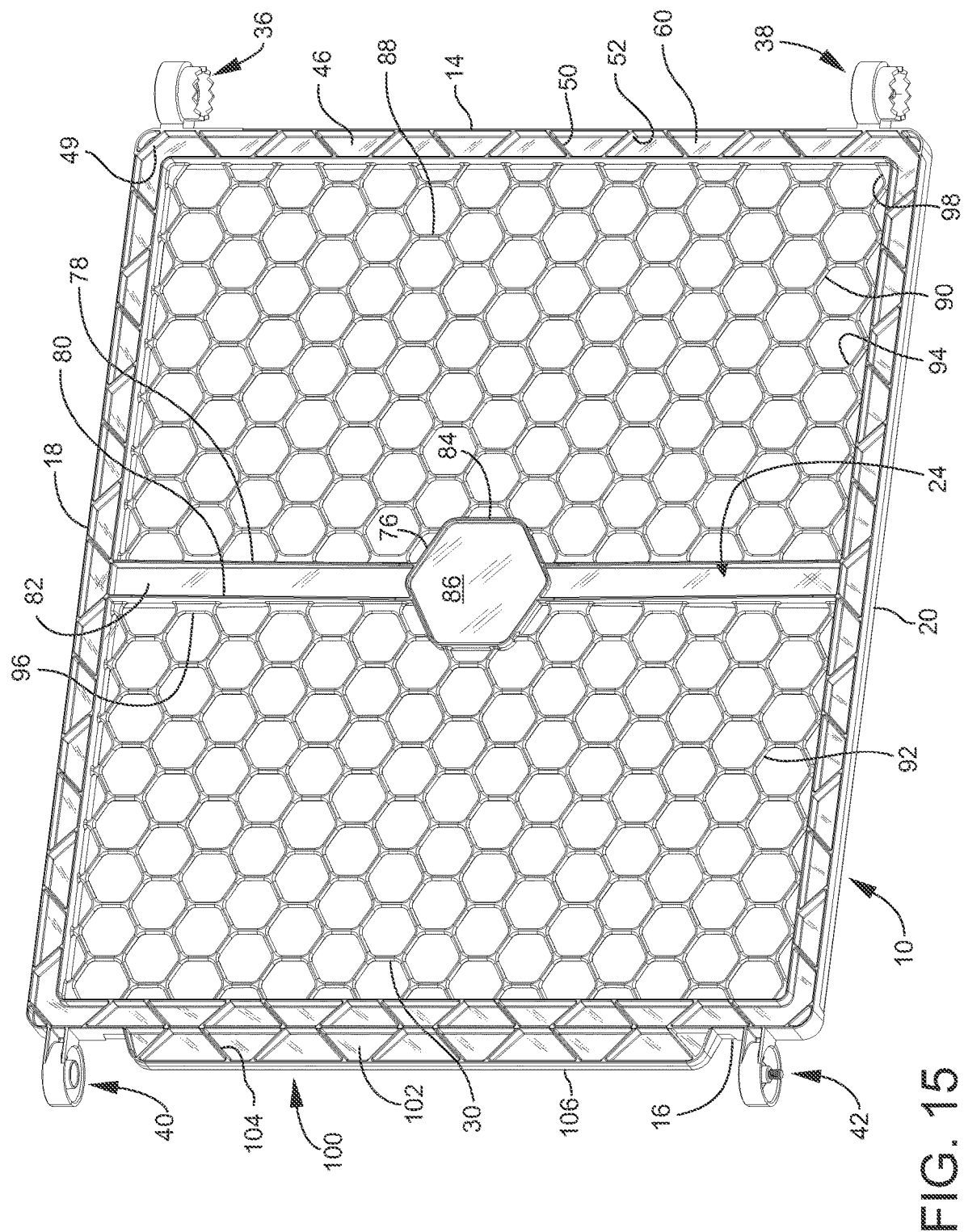
FIG. 15 is a rear perspective view of the base unit of FIG. 14.

A first and second base unit 10 can swing relative to each other from between zero degrees and 270 degrees. At zero degrees, the first and second base units 10 are face to face, such as shown in FIG. 8, where the outer edges of one face of the H-channel 26 of the first base unit 10 abut the outer edges of one face of the H-channel 26 of the second base unit 10. At slightly over 270 degrees, at about 275 degrees, the outer edges of the H-channel 26 of end frame member 14 of the other face of the first base unit 10 abut the outer edges of the H-channel 26 of end frame member 16 of the other face of the second base unit 10 so as to prevent pivoting further than about 275 degrees.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A base unit comprising:
   a) a frame that includes:
      i) first, second, third, and fourth frame members;
      ii) the first and second frame members being end frame members;
      iii) the third and fourth frame members being longitudinal frame members, the third frame member being between the first and second members, the fourth member being between the first and second members;
      iv) a first face that includes a first plane;
      v) a second face that includes a second plane, the first and second planes being parallel to each other;
   b) a body between the first, second, third and fourth frame members, the body comprising a network;
   c) first and second connectors engaged to the first member, the first and second connectors having a pivoting axis in the second plane;
   d) third and fourth connectors engaged to the second member, the third and fourth connectors having a pivoting axis in the first plane;
   e) the first and fourth connectors being obliquely positioned relative to each other;
   f) the second and third connectors being obliquely positioned relative to each other;
   g) such that, when a first base unit is engaged to a second base unit, the first connector of the first base unit is engagable to the fourth connector of the second base unit and the second connector of the first base unit is engagable to the third connector of the second base unit; and
   h) a bracket having a pair of jaws that are resiliently spreadable apart from each other, the jaws being spaced from each other by a first distance when at a rest position, the first and second frame members having inner and outer walls having a depth, said depth defining a second distance greater than the first distance, the jaws being resiliently spreadable apart to said second distance such that the jaws are clampable on one of the first and second frame members whereby the bracket can function to fix said base unit to an object.

2. The base unit of claim 1, wherein the first connector comprises a male cylinder having a distal end and a set of annularly extending teeth on the distal end, wherein the fourth connector comprises a female cylinder having an internal set of annularly extending teeth to engage the annularly extending teeth of the male cylinder.

3. The base unit of claim 2, wherein the second connector comprises a male cylinder having a distal end and a set of annularly extending teeth on said distal end, wherein the third connector comprises a female cylinder having an internal set of annularly extending teeth to engage the annularly extending teeth of the male cylinder of the second connector.

4. The base unit of claim 1, wherein the second connector comprises a male cylinder having a distal end and a set of annularly extending teeth on the distal end, wherein the third connector comprises a female cylinder having an internal set of annularly extending teeth to engage the annularly extending teeth of the male cylinder.

5. The base unit of claim 1, wherein each of the first, second, third and fourth frame members includes an H-channel.

6. The base unit of claim 5, wherein the H-channel runs endlessly about the frame.

7. The base unit of claim 5, wherein the H-channel includes inner and outer walls, each of the inner walls having a first edge on the first face and a second edge on the second face, each of the outer walls having a first edge on the first face and a second edge on the second face, the first edges of the inner and outer walls defining said first plane, and the second edges of the inner and outer walls defining said second plane.

8. The base unit of claim 1, wherein the network comprises a set of hexagonal rings.

9. The base unit of claim 1, and further comprising an intermediate frame member, the intermediate frame member running from the third frame member to the fourth frame member intermediate of the first and second end members, the intermediate frame member dividing the network into two sections separated from each other.

10. The base unit of claim 9, wherein the intermediate frame member includes an H-channel.

11. The base unit of claim 9, wherein the intermediate frame member includes a center piece having a wall defining a third plane, the third plane being between the first and second planes and parallel to the first and second planes, the center piece having a periphery defining a hexagon.

12. The base unit of claim 1, wherein said bracket includes a pivot pin opposite of the jaws, and further comprising a mount that is connectable to said object, the mount having a pin receiver for said pivot pin of said bracket.

13. The base unit of claim 12, and further comprising a swing lock on said mount, said swing lock being swingable over said pivot pin when said pivot pin is in said pin receiver to retain said pivot pin in said mount and to retain said bracket and base unit to said mount, said swing lock being swingable to an out-of-the-way position away from said pivot pin to permit the pivot pin out of the pin receiver such that the bracket and base unit may be disengaged from said mount.

14. The base unit of claim 1, wherein, when any of the longitudinal frame members of the first base unit is aligned with any of the longitudinal frame members of the second base unit:
  a) the first connector of the first base unit is engagable only to the fourth connector of a second base unit, is not engagable to the second connector of the second base unit, and is not engagable to the third connector of the second base unit; and
  b) the second connector of the first base unit is engagable only to the third connector of a second base unit, is not engagable to the first connector of the second base unit, and is not engagable to the fourth connector of the second base unit.

15. The base unit of claim 1, wherein:
  a) each of the first, second, third, and fourth connectors includes a first interface, wherein the first interface of each of the first, second, third, and fourth connectors of the first base unit engaging a second interface, respectively, of the fourth, third, second, and first connectors of the second base unit;
  b) wherein the third frame member extends between and confronts the first and third connectors and wherein the fourth frame member extends between and confronts the second and fourth connectors;
  c) wherein each of the longitudinal members includes an outer wall having an outer surface that defines a plane;
  d) a distance from said first interface of the first connector to the plane of the outer surface of the fourth frame member is a first distance;
  e) a distance from said first interface of the fourth connector to the plane of the outer surface of the third frame member is a second distance that is the same as the first distance;
  f) a distance from said first interface of the second connector to the plane of the outer surface of the third frame member is a third distance; and
  g) a distance from said first interface of the third connector to the plane of the outer surface of the fourth frame member is a fourth distance that is the same as the third distance such that when the first and second base units are engaged the third frame members of the first and second base units are disposed at the same elevation and the fourth frame members of the first and second base units are disposed at the same elevation.

16. A plastic base unit apparatus convertible between an endless enclosure and a barrier having two opposite ends spaced apart from each other, comprising:
  a) first, second, third, and fourth plastic base units, each of the first, second, third, and fourth plastic base units being identical, each of the first, second, third and fourth base units having a pair of ends, each of the first, second, third, and fourth plastic base units having first, second, third and fourth connectors engaged on ends of the base units;
  b) the first and fourth connectors of each base unit being positioned obliquely of each other;
  c) the second and third connectors of each base unit being positioned obliquely of each other;
  d) the first and fourth connectors of different base units being engagable to each other;
  e) the second and third connectors of different base units being engagable to each other;
  f) each of the base units having a designated top and a designated bottom when in stand alone form separate from the other base units, adjacent base units in said endless enclosure and in said barrier having the designated top adjacent to the designated bottom;
  g) each of the first and fourth connectors being disengagable from each other and each of the second and third connectors being disengagable from each other such that the endless enclosure may be reconfigured into a barrier having two opposite ends; and
  h) a bracket having a pair of jaws that are resiliently spreadable apart from each other, the jaws being spaced from each other by a first distance when at a rest position, said base unit having a depth, said depth defining a second distance greater than the first distance, the jaws being resiliently spreadable apart to said second distance such that the jaws are clampable on one of the base units whereby the bracket can function to fix said base unit to an object.

17. The base unit of claim 16, wherein said bracket includes a pivot pin opposite of the jaws, and further comprising a mount that is connectable to said object, the mount having a pin receiver for said pivot pin of said jaw.

18. The base unit of claim 17, and further comprising a swing lock on said mount, said swing lock being swingable over said pivot pin when said pivot pin is in said pin receiver to retain said pivot pin in said mount and to retain said bracket and said base unit to said mount, said swing lock being swingable to an out-of-the-way position away from said pivot pin to permit the pivot pin out of the pin receiver such that the bracket and said base unit may be disengaged from said mount.

19. A base unit comprising:
  a) a frame that includes:
    i) first, second, third, and fourth frame members;
    ii) the first and second frame members being end frame members;
    iii) the third and fourth frame members being longitudinal frame members, the third frame member being between the first and second members, the fourth member being between the first and second members;
    iv) a first face that includes a first plane;
    v) a second face that includes a second plane, the first and second planes being parallel to each other;
  b) a body between the first, second, third and fourth frame members, the body comprising a network;

c) first and second connectors engaged to the first member, the first and second connectors having a pivoting axis in the second plane;
d) third and fourth connectors engaged to the second member, the third and fourth connectors having a pivoting axis in the first plane;
e) the first and fourth connectors being obliquely positioned relative to each other;
f) the second and third connectors being obliquely positioned relative to each other;
g) such that, when a first base unit is engaged to a second base unit, the first connector of the first base unit is engagable to the fourth connector of the second base unit and the second connector of the first base unit is engagable to the third connector of the second base unit;
h) wherein the first connector includes a first base cylindrical portion, a first toothed cylindrical portion, and a first inner cylindrical portion, an outside diameter of the first base cylindrical portion being greater than an outside diameter of the first toothed cylindrical portion, the first toothed cylindrical portion being inwardly of the first base cylindrical portion, the first inner cylindrical portion being inside of the first toothed cylindrical portion, the first base cylindrical portion, the first toothed cylindrical portion, and the first inner cylindrical portion being coaxial, the first base cylindrical portion including a first top having a first opening, the first toothed cylindrical portion having a first distal end and a set of first annularly extending teeth on the first distal end;
i) wherein the second connector includes a second base cylindrical portion, a second toothed cylindrical portion, and a second pin mount, an outside diameter of the second base cylindrical portion being greater than an outside diameter of the second toothed cylindrical portion, the second toothed cylindrical portion being inwardly of the second base cylindrical portion, the second pin mount being inside of the second toothed cylindrical portion, the second base cylindrical portion, the second toothed cylindrical portion, and the pin mount being coaxial, the second base cylindrical portion including a second closed top, the second pin mount having a second pin, and the second toothed cylindrical portion having a second distal end and a set of second annularly extending teeth on the second distal end;
j) wherein the third connector comprises a third base cylindrical portion, a third inner cylindrical portion inside of the third base cylindrical portion, and a third circular channel between the third base cylindrical portion and the third inner cylindrical portion, the third circular channel having a set of third annularly disposed teeth therein, the third base cylindrical portion, the third inner cylindrical portion, the third circular channel, and the third annularly disposed teeth being coaxial, the third base cylindrical portion including a third top having a third opening;
k) wherein the fourth connector comprises a fourth base cylindrical portion and a fourth inner base inside of the fourth base cylindrical portion, a set of fourth annularly disposed teeth being between the fourth base cylindrical portion and the fourth inner base, the fourth inner base mounting a fourth pin, the fourth base cylindrical portion, fourth inner base, fourth annularly disposed teeth, and fourth pin being coaxial, the fourth base cylindrical portion having a fourth closed top;
l) a first hand wheel having a first shaft with a first distal end, the first distal end having therein a first threaded pin receiver, the first hand wheel further having a first face that rotationally slides on the first top of the first connector of the first base unit, the first shaft extending through the first opening of the first connector of the first base unit and engaging the fourth pin of the fourth connector of the second base unit such that the first annularly disposed teeth of the first connector of the first base unit and the fourth annularly disposed teeth of the fourth connector of the second base unit may be spaced from each other to permit the first and second base units to freely pivot relative to each other, such that the first annularly disposed teeth of the first connector of the first base unit and the fourth annularly disposed teeth of the fourth connector of the second base unit may loosely engage each other so that incremental pivot positions can be felt by a human hand pivoting the first and second base units, and such that the first annularly disposed teeth of the first connector of the first base unit and the fourth annularly disposed teeth of the fourth connector of the second base unit may be tightly engaged with each other to fix the first and second base units from pivoting; and
m) a second hand wheel having a second shaft with a second distal end, the second distal end having therein a second threaded pin receiver, the second hand wheel further having a second face that rotationally slides on the third top of the third connector of the first base unit, the third shaft extending through the third opening of the third connector of the first base unit and engaging the second pin of the second connector of a third base unit such that the third annularly disposed teeth of the third connector of the first base unit and second annularly disposed teeth of the second connector of the third base unit may be spaced from each other to permit said first and third base units to freely pivot relative to each other, such that said third annularly disposed teeth of the third connector of the first base unit and second annularly disposed teeth of the second connector of the third base unit may loosely engage each other so that incremental pivot positions can be felt by a human hand pivoting the first and third base units, and such that said third annularly disposed teeth of the third connector of the first base unit and the second annularly disposed teeth of the second connector of the third base unit may be tightly engaged with each other to fix the first and third base units from pivoting.

\* \* \* \* \*